United States Patent
Yoshino et al.

[11] Patent Number: 6,151,542
[45] Date of Patent: Nov. 21, 2000

[54] ENGINE TRANSMISSION CONTROL SYSTEM

[75] Inventors: Takahiro Yoshino; Shusaku Katakura, both of Kanagawa; Masayuki Yasuoka, Yokohama, all of Japan

[73] Assignee: Nissan Motor Co., Ltd., Yokohama, Japan

[21] Appl. No.: 09/390,688

[22] Filed: Sep. 7, 1999

[30] Foreign Application Priority Data

Sep. 7, 1998 [JP] Japan ................................. 10-252757

[51] Int. Cl.$^7$ ............................... G06F 7/00; B60K 41/04
[52] U.S. Cl. ................................ 701/54; 701/51; 701/55; 701/56; 475/198; 477/34; 477/42; 477/43; 477/107; 477/108
[58] Field of Search ................................ 701/54, 51, 55, 701/56, 87; 477/34, 37, 42, 43, 107, 108, 111; 475/120, 123, 127, 198

[56] References Cited

U.S. PATENT DOCUMENTS 4,107,776  8/1978  Beale ......................................... 701/54
4,735,114  4/1988  Satoh et al. ............................... 74/866
5,772,550  6/1998  Kamada et al. ......................... 475/120

FOREIGN PATENT DOCUMENTS

| 62-110536 | 5/1987 | Japan . |
| 6-87356 | 3/1994 | Japan . |
| 7-172217 | 7/1995 | Japan . |
| 9-267664 | 10/1997 | Japan . |
| 10-148144 | 6/1998 | Japan . |

*Primary Examiner*—William A. Cuchlinski, Jr.
*Assistant Examiner*—Yonel Beaulieu
*Attorney, Agent, or Firm*—Foley & Lardner

[57] ABSTRACT

A control system for a vehicle with an engine-CVT power train senses operator's desire relative to movement of the vehicle and translates the sensed operator's desire into a predetermined variable indicative of drive force applicable to the vehicle drive wheel. In integrated control mode, the predetermined variable indicative of drive force controls the engine throttle and the ratio of the CVT. In individual control mode, the integrated control is put out of operation and the sensed operator's desire controls the engine throttle and the ratio of the CVT. The control system provides an improved control over the transition period between the control modes.

10 Claims, 24 Drawing Sheets

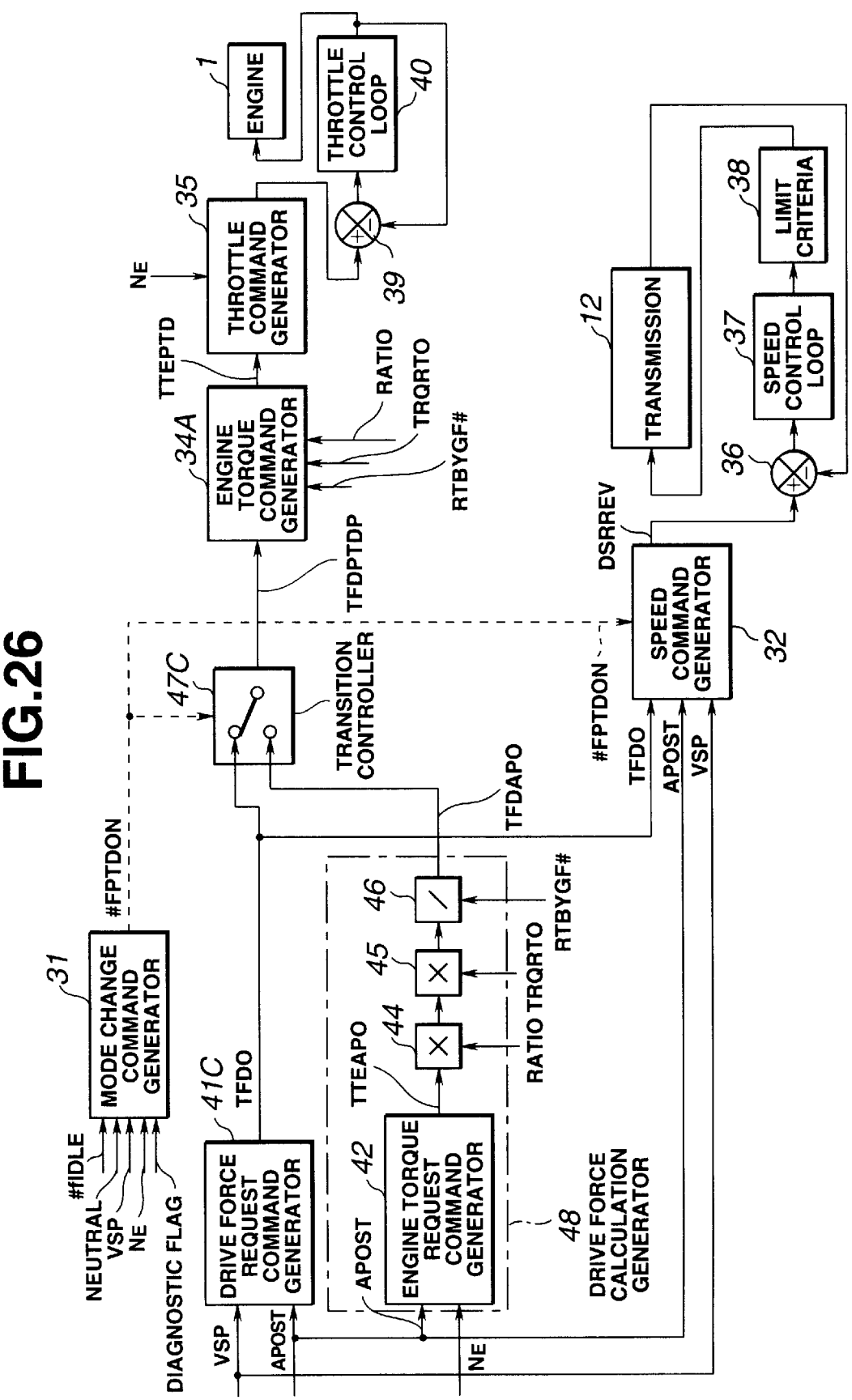

ENGINE TRANSMISSION CONTROL SYSTEM

FIELD OF THE INVENTION

The present invention relates to a control system for a vehicle with an engine-transmission power train.

BACKGROUND OF THE INVENTION

In drive torque control, drive torque is calculated as the product of actual engine torque, the ratio, the drivetrain efficiency factor, and in the case of an automatic transmission, the converter amplification. Improved integrated control over actual engine torque and ratio is needed to cope with environmental requirements, such as, reductions of nitrogen oxides (NOx) emission and carbon dioxide ($CO_2$) emission, without sacrificing ride feel. The integrated control can provide drive torque high enough to match the vehicle operator's desire as well as sufficiently low levels of NOx and $CO_2$ emissions with excellent fuel economy. With the integrated control, transition response to the transmission may be improved by controlling the engine.

JP-A 10-148144 discloses an engine-transmission control system for a vehicle. The control system senses operator's desire relative to movement of the vehicle by measuring actual accelerator pedal angle. The actual pedal angle selects ratio to be established in the transmission and target engine torque. The engine throttle is controlled to adjust the actual engine torque toward the selected target engine torque.

U.S. patent application Ser. No. 09/325,795 was filed on Jun. 4, 1999 and assigned to the assignee of the present application, and is currently pending. A vehicular engine-CVT control system, which is disclosed by this U.S. patent application, senses operator's desire relative to movement of the vehicle and translates the sensed operator's desire into drive torque. In integrated control mode, the drive torque controls the engine throttle and the ratio of the CVT. Specifically, first target engine torque is calculated based on the drive torque, the converter amplification, and the CVT ratio. The control system has individual control mode where the integrated control is put out of operation. In the individual control mode, the sensed operator's desire controls the engine throttle, while the drive torque keeps on controlling the ratio of the CVT. Specifically, the sensed operator's desire determines second target engine torque. The control system provides a control over the transition period over the integrated and individual control modes. The first engine torque is used as a first input to and the second engine torque is used as a second input to a transition controller. The transition controller calculates a final target engine torque as the sum of the first product of (1−K) and the second target engine torque and the second product of K and the first target engine torque. The character K is a coefficient that varies linearly between 0 and 1 within a predetermined period where the magnitude of a difference between the first engine torque and the second engine torque is unaltered. In the individual control mode, the coefficient K is 0 so that the final target engine torque is as high as the second target engine torque. In the integrated control mode, the coefficient K is 1 so that the final target engine torque is as high as the first target engine torque. During transition period, the coefficient K varies from 0 to 1 for a shift from the individual control mode to the integrated control mode, and it varies from 1 to 0 for a shift from the integrated control mode to the individual control mode. The final target engine torque controls the engine throttle.

This control system is fairly well developed. However, a need remains for further development of such system, especially in light of current movement to an integrated vehicular power train control system.

SUMMARY OF THE INVENTION

Accordingly, it is an object of the present invention to provide a control system for a vehicle based on understanding and recognizing insufficiency in the previously proposed system mentioned above.

It is a further object of the present invention to provide such a control system, which increases operator satisfaction.

It is a specific object of the present invention to provide a control system, which uses unique data processing system to provide a shock free shift from the individual control mode to the integrated control mode and vice versa, thereby assuring quality mode change.

The attainment of these objects may be achieved through use of drive force applicable to a drive wheel of a vehicle. Specifically, a control system senses vehicle operator desire relative to movement of the vehicle and translates the sensed operator desire into drive force applicable to the drive wheel in integrated control mode. The control system estimates drive force applicable to the drive wheel in individual control mode. Both of the drive forces are used to provide a final drive force. The final drive force is used to calculate engine torque. The calculated engine torque controls a torque control element of the engine. During a transition period for a shift from one to the other control modes, the final drive force varies smoothly from the drive force level before the shift to the drive force level after the shift without any substantial torque shock. Such a substantial torque shock might otherwise occur if there is a difference in torque between the two drive force levels.

According to one aspect of the present invention, there is provided a control system for a vehicle including an engine coupled to apply torque to at least one drive wheel of the vehicle by means of a transmission with a ratio actuator, the ratio actuator being positioned to establish various speed ratios between input and output shafts of the transmission in response to a ratio actuator command, the engine having a throttle which opens in degrees and a throttle actuator positioned to establish various open degrees of the throttle in response to a throttle actuator command, the control system comprising:

sensors sensing an operating parameter indicative of vehicle operator's desire relative to movement of the vehicle and operating parameters indicative of the vehicle status that includes the vehicle speed, the engine speed, and the ratio;

a drive force request command generator translating the vehicle operator's desire into a first target value indicative of drive force applicable to the drive wheel for operation in an integrated control mode;

a mode change command generator determining whether or not the integrated control mode should be in operation and generating a mode signal;

a speed command generator generating a speed command in response to said first target value indicative of drive force;

means for generating the ratio actuator command required for the ratio actuator to get said speed command out of the transmission;

a drive force calculation generator estimating a second target value indicative of drive force applicable to the drive wheel for operation in an individual control mode;

a transition controller processing said first and second target values and generating a drive force command;

an engine torque command generator generating a torque command in response to said drive force command; and

BRIEF DESCRIPTION OF THE DRAWINGS

FIG. 26 is a controls diagram similar to FIG. 22 illustrating still another implementation of the present invention.

DESCRIPTION OF THE PREFERRED EMBODIMENTS

Figure 1:
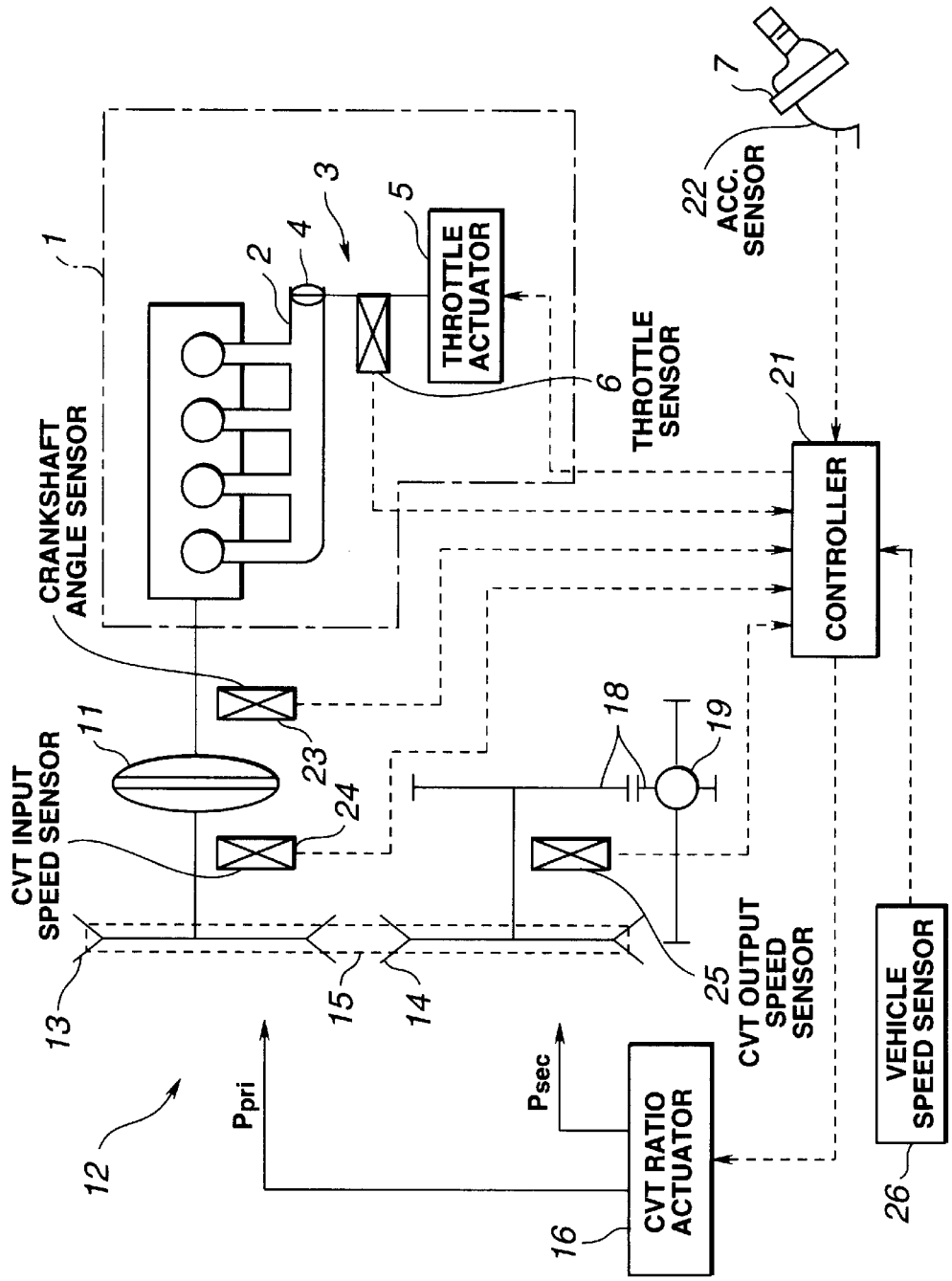
FIG. 1 is hardware drawing showing the relationship between the controller, the CVT, and the engine.

Referring to FIG. 1, a controller 21 controls an engine 1 and a continuously variable transmission (CVT) 12. The controller 21 includes clock, a microcomputer, input/output unit, a throttle actuator driver, a stepper motor driver, memory unit, timer, and counter. The engine 1 includes throttle actuator 5, throttle 4 in air intake system 2, throttle position sensor 6. The throttle 4, throttle actuator 5, and throttle sensor 6 constitute an electronically controlled throttle actuator 3. Typical example of such throttle actuator is illustrated in FIGS. 8–11 of U.S. Pat. No. 4,735,114 issued Apr. 5, 1988 and entitled "Control System For Vehicle With Engine And Continuously Variable Transmission", which has been hereby incorporated by reference in its entirety. The engine 1 is coupled to apply torque to at least one drive wheel, not shown, of a vehicle by means of torque converter 11, CVT 12 and final drive train including final drive gear 18 and differential gear 19. The CVT 12 includes input pulley 13, output pulley 14, ratio actuator 16, V-belt 15, pressure control valve, not shown, and input and output shafts. It will be understood that the present invention is not limited to the use of CVT's with pulley/V-belt power transfer. The present invention is operational with any other type of CVT, including hydrostatic and friction CVT's.

In the controller 21, the clock provides operational clock pulses to the microcomputer. The microcomputer controls the input/output unit, the memory unit, and the timer through control bus. Bi-directional data bus provides for the transfer of data between the input/output unit, the memory unit, the timer, and the microcomputer. A vehicle operator's desire relative to movement of the vehicle is fed to the input/output unit of the controller 21 by an accelerator sensor 22 operatively associated with the vehicle accelerator pedal 7. The accelerator sensor 22 senses an operating parameter indicative of depression degree of the accelerator pedal 7. As will be explained below, the preferred implementation of the present invention includes integrated control mode of operation of the vehicle and individual control mode of operation of the vehicle.

The input/output control unit controls the throttle actuator driver, preferably a stepper motor driver. The throttle actuator driver provides a control signal to the engine 1. The input/output unit also controls the stepper motor driver. The stepper motor driver provides a control signal to the CVT 12.

In the engine 1, the throttle actuator 5 receives the control signal. The throttle actuator 5 controls the position of the throttle 4. The throttle 4 controls the torque and power output of the engine 1. The throttle sensor 6 senses the throttle position (or the throttle opening degree) and inputs the sensed throttle position into the controller 21. The output power of the engine 1 is transmitted through the engine output shaft (crankshaft), which is connected through the torque converter 11 to the input shaft of the CVT 12.

In the CVT 12, the ratio actuator 16 receives the control signal. In response to the control signal, the ratio actuator 16 moves a lever, connected to the actuator shaft, to control the ratio of the CVT 12. The lever is connected to the actuator shaft at one end and to positional pulley half of the input pulley 13 at the other end. At a point between the two ends, the lever is pivotally connected to valve rod of the pressure control valve. This arrangement provides position feedback of the pulley 13 to the valve. As the ratio actuator 16 moves the lever, the valve, in response to the movement of the valve rod, alters the hydraulic pressure Ppri to the input pulley 13 and the hydraulic pressure Psec to the output pulley 14. As the pressure Ppri is altered relative to the pressure Psec, the pulley halves of the input and output pulleys 13 and 14 move, changing the ratio of the CVT 12. As the pulley half of the input pulley 13 moves, the lever moves repositioning the valve rod, providing a means for the valve to stop the pulley halves from moving.

The speed of the engine 1, also the speed of a pump impeller of the torque converter 11, is sensed by a crankshaft angle sensor 23 and fed to the controller 21. The speed of the CVT input shaft, also the speed of a turbine runner of the torque converter 11, is sensed by a CVT input speed sensor 24 and fed back to the controller 21. The speed of the CVT output shaft is sensed by a CVT output speed sensor 25 and fed to the controller 21. A vehicle speed sensor 26 senses an operating parameter indicative of the speed of the vehicle and feeds the sensed parameter to the controller 21.

The sensor signal from each of the sensors 23, 24, and 25 is fed to the counter in the controller 21. The counter counts the number rotations of the engine crankshaft, the CVT input shaft, and the CVT output shaft separately and feeds the counts to the timer. With the information provided by the timer, the microcomputer can compute the rotational speeds of the engine 1, the CVT input shaft and the CVT output shaft. The implementation of the present invention into the above-described hardware will be further explained below.

Figure 2:
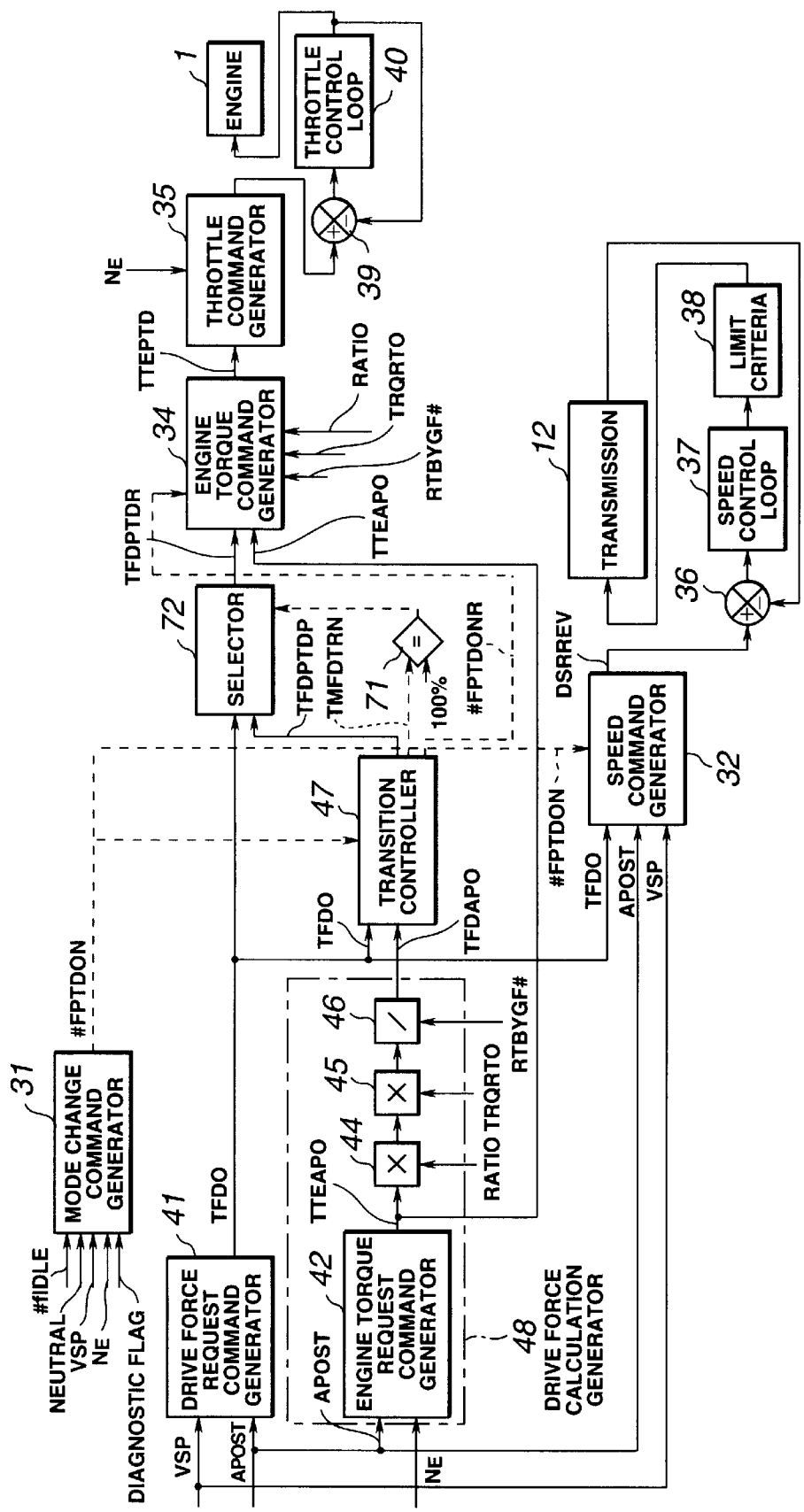
FIG. 2 is a controls diagram of the preferred implementation, showing throttle control and CVT ratio control.
Figure 3:
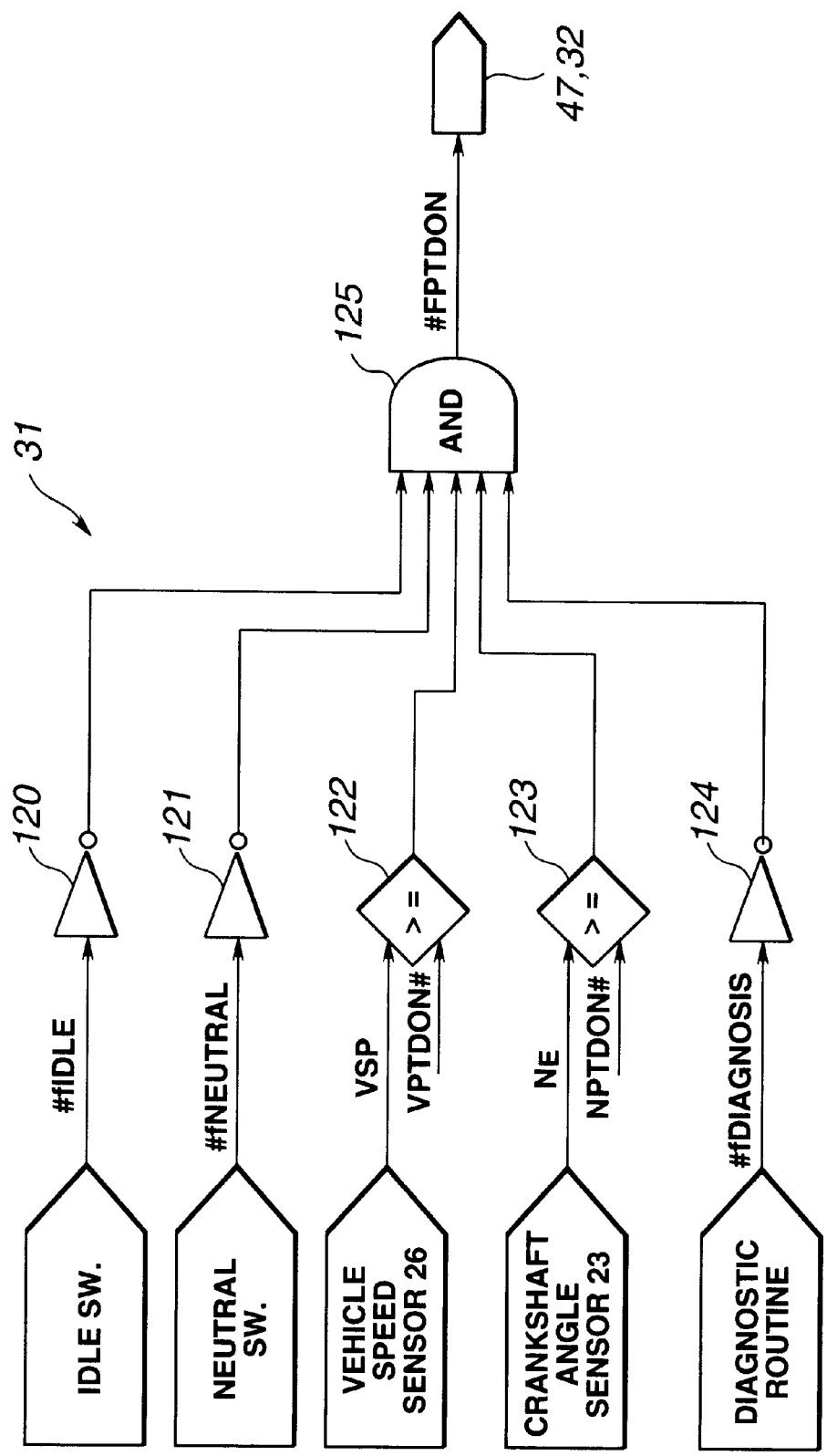
FIG. 3 is a block diagram of a mode change command generator.

A preferred implementation of the present invention can be understood with reference to the controls diagram in FIG. 2. The vehicle operator's desire relative to movement of the vehicle is sensed by the accelerator pedal sensor 22 and used as an input signal APOST. The signal APOST is indicative of the angular position or degree of depression of the accelerator pedal 7. A mode change command generator 31 determines whether or not the integrated control mode should be in operation and generates a mode signal in the form of a mode change flag #FPTDON. The mode signal is present when #FPTDON=1, while it is absent when #FPTDON=0. Operating parameters indicative of vehicle status are used as inputs to the mode change command generator 31. Referring also to FIG. 3, the operating parameters include positions of idle and neutral switches, vehicle speed VSP, engine speed $N_E$, and the diagnostic result. In FIG. 3, an idle flag #fIDLE is at a logical one level when the idle switch is turned on at idle operation of the engine 1. At an inverter 100, the logical level of #fIDLE is inverted and then input to an AND gate 125. A neutral flag #fNEUTRAL is at a logical one level when the power train is in neutral. The logical level of #fNEUTRAL is inverted at an inverter 121 and input to the AND gate 125. At a comparison point 122, the vehicle speed VSP is compared with a predetermined value VPTDON#. A logical one level is input to the AND gate 125 when VSP is greater than or equal to VPTDON#. A comparison point 123 compares the engine speed $N_E$ with a predetermined value NPTDON#. A logical one level is input to the AND gate 125 when $N_E$ is greater than or equal to NPTDON#. The diagnostic result flag #fDIAGNOSIS is at logical one level when the diagnostic routine has found anything out of order. The logical level is inverted at an inverter 124 and input to the AND gate 25.

The AND gate 125 outputs the mode signal in the form of mode change flag #FPTDON. The flag #FPTDON is at logical one level when 1) the idle switch is turned off,
2) the neutral switch is turned off,
3) VSP is greater than or equal to VPTDON#,
4) $N_E$ is greater than or equal to NPTDON#, and
5) #fDIAGNOSIS=0.

The flag #FPTDON is otherwise at logical zero level.

Figure 4:
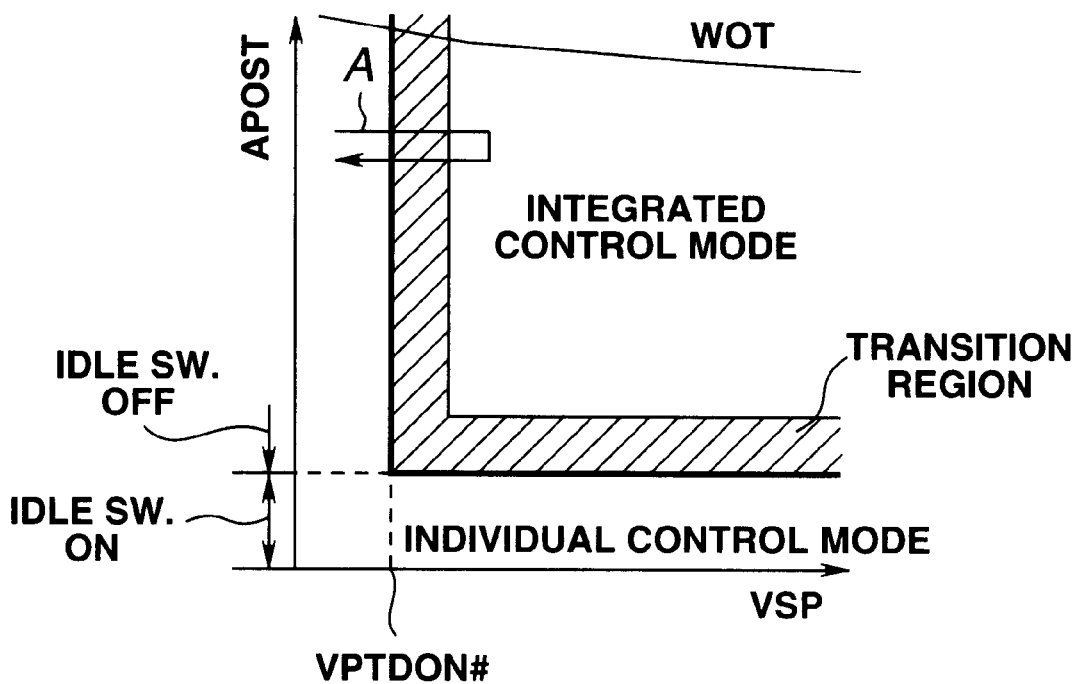
FIG. 4 is a map showing a region where an integrated control mode is in operation and a region where an individual control mode is in operation and the integrated control mode is out of operation.

FIG. 4 illustrates in a simple manner a region where the integrated control mode should be in operation and a region where the individual control mode should be in operation. The integrated control mode is out of operation within the region where the individual control mode should be in operation. A transition region is shadowed. The transition region is a part of and defines the border of the integrated control mode region with the individual control mode region. The wide open throttle position is illustrated by a line WOT. In FIG. 4, the integrated control mode is in operation when the vehicle speed VSP is greater than or equal to VPTDON# and the idle switch is turned off (#fIDLE=0). Otherwise, the integrated control mode is out of operation and the individual control mode is in operation. Moving an operating point along the path as illustrated by an elongated arrow A causes the flag #FPTDON to change from zero level to one level if VSP exceeds VPTDON# and then to one level if subsequently VSP drops below VPTDON#. The mode change command generator 31 may be a simple control routine. The mode signal #FPTDON is fed to a transition controller 47 and a speed command generator 32 (see FIG. 2).

Referring to FIG. 2, the accelerator pedal angular position APOST, which is indicative of the vehicle operator's desire relative to movement of the vehicle, is input to the speed command generator 32 and also to a drive force request command generator 41 and an engine torque request command generator 42. The vehicle speed signal VSP is fed to the drive force request command generator 41 and also to the speed command generator 32. As will be described later in connection with FIG. 6, the drive force request command generator 41 translates the sensed vehicle operator's desire APOST into a first target value TFDO indicative of drive force applicable to the drive wheel.

This first target value TFDO is input into the speed command generator 32, which outputs a speed command signal DSRREV. The speed command signal DSRREV is input into a comparison block 36. The comparison block 36 compares the speed command DSRREV with actual CVT input shaft speed. An error signal is output and fed into a speed control loop 37, which may be a simple PID controller, but is not so limited. The speed control loop 37 controls the ratio of the CVT 12 by outputting a ratio command, which is limited at a box 38, and input into the CVT 12. It shall be understood that the scope of the invention is not limited to use with the type of transmission control described above. The transmission control described above is preferred transmission control for use with the present invention.

Figure 5:
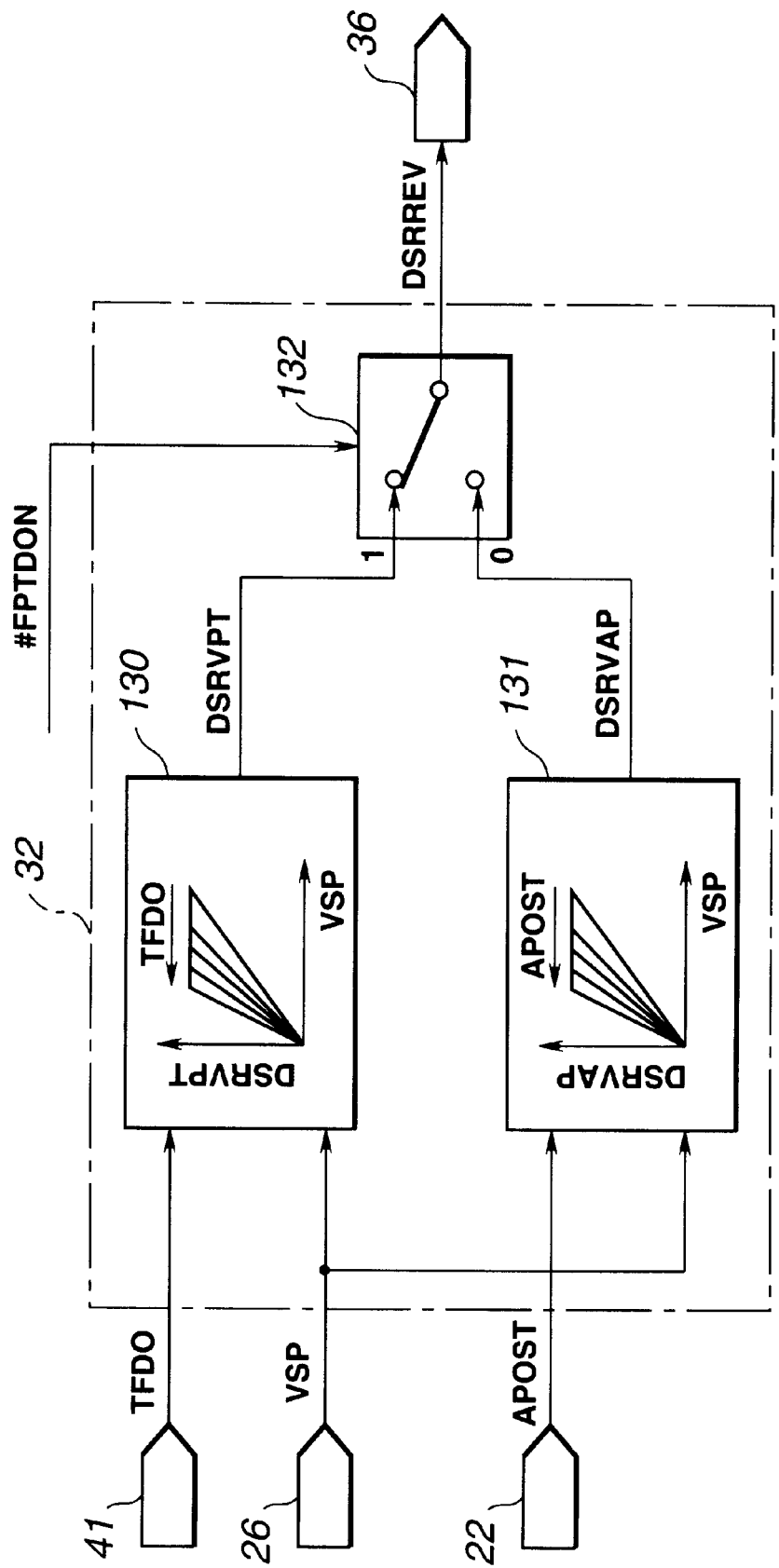
FIG. 5 is a block diagram of a speed command generator.

Referring to FIG. 5, the speed command generator 32 determines a first target value DSRVPT of speed of CVT input shaft at a box 130 in response to the first target value TFDO indicative of drive force and vehicle speed VSP. It also determines a second target value DSRVAP of speed of CVT input shaft at a box 131 in response to vehicle speed VSP and the vehicle operator's desire APOST. The first target value DSRVPT of speed of CVT input shaft is suitable for operation of the CVT 12 in the integrated control mode. The second target value DSRVAP of speed of CVT input shaft is suitable for operation of the CVT 12 in the individual control mode. The speed command generator 32 may include two-dimensional look-up tables in the controller memory. The first and second target values DSRVPT and DSRVAP of speeds of CVT input shaft are fed as first and second inputs to a selector box 132. The mode signal #FPTDON is fed into the selector box 132. In response to presence of the mode signal where #FPTDON=1, the speed command generator 32 generates the first target value DSRVPT as the speed command DSRREV. In response to absence of the mode signal where #FPTDON=0, the speed command generator 32 generates the second target value DSRVAP as the speed command DSRREV.

Referring to FIG. 2, the drive request command generator 41 translates the sensed vehicle operator's desire APOST into a first target value TFDO indicative of drive force applicable to the drive wheel during operation in the integrated control mode. A drive force calculation generator 48 calculates or estimates a second target value TFDAPO indicative of drive force applicable to the drive wheel during operation in the individual control mode. The first and second target values TFDO and TFDAPO indicative of drive forces are used as the inputs to a transition controller 47, which outputs a drive force command TFDPTDP. The drive force command TFDPTDP is used as the input to an engine torque command generator 34, which outputs an engine torque command TTEPTD. The engine torque command generator 34 is described later in connection with FIG. 11. The engine torque command TTEPTD is input into a throttle command generator 35 together with actual engine speed $N_E$. The throttle command generator 35 generates, as a function of engine torque command TTEPTD and engine speed $N_E$, a throttle position command. The throttle command generator 35 may be a two-dimensional look-up table in computer memory.

The throttle position command is input into comparison block 39, which compares the actual throttle position with the throttle position command and outputs a throttle error signal. The throttle error signal is input into a throttle control loop 40, which controls the position of the throttle 4. The throttle control loop 40 may consist of a PID controller, but not limited to such a controller. The actual throttle position controls the torque output of the engine 1.

Figure 6:
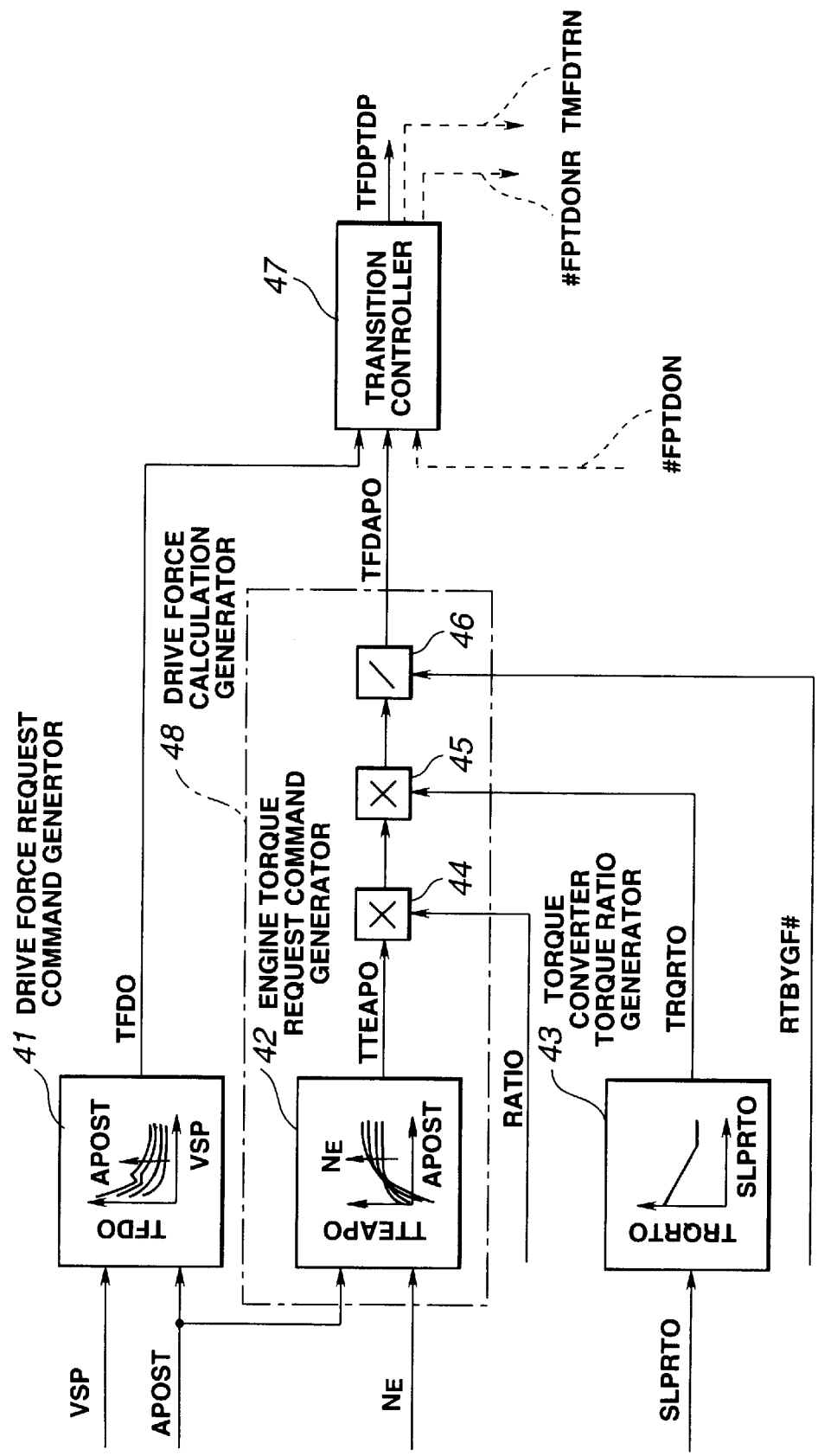
FIG. 6 is a block diagram of a drive force request command generator and a drive force calculation generator, which provide a first target value indicative of drive force and a second target value indicative of drive force, respectively, as inputs to a transition controller.

Referring to FIG. 6, the drive force request command generator 41 generates, as a function of vehicle operator's desire through accelerator depressed position APOST and vehicle speed VSP, the first target value TFDO indicative of drive force applicable to the drive wheel during operation in the integrated control mode. The drive force request command generator 41 may consist of a two-dimensional look-up table in computer memory. Such first target value TFDO indicative of drive force is predetermined to give the engine-CVT power train the drive force required under travel conditions during operation in the integrated control mode.

The drive force calculation generator 48, which generates the second target value TFDAPO indicative of drive force applicable to the drive wheel during operation in individual control mode, includes an engine torque request command generator 42, two multiplication blocks 44 and 45, and a division block 46. The second target value TFDAPO is indicative of drive force that is estimated or calculated if operations of the engine 1 and the CVT 12 are independent during operation in the individual control mode. Thus, the second target value TFDAPO may be referred to as accelerator position dependent estimated drive force. The second target value TFDAPO indicative of drive force may be estimated or calculated based on target or estimated engine torque under current engine operating condition, actual ratio RATIO of the CVT 12, torque converter amplification or torque ratio TRQRTO, and constant RTBYGF#. The constant RTBYGF# is a ratio of (the gear ratio of the final drive train 18 and 19) to (the effective radius of the drive wheel).

In FIG. 6, the engine torque request command generator 42 translates the sensed vehicle operator's desire APOST into a target value TTEAPO of engine torque by generating the target value TTEAPO, as a function of accelerator depressed position APOST and engine speed $N_E$. The engine torque request command generator 42 may consist of a two-dimensional look-up table in computer memory. The ratio RATIO of the CVT 12 is given as a speed ratio between the CVT input shaft and the CVT output shaft. The target value TTEAPO is input into the multiplication block 44 together with the CVT ratio RATIO. The product, TTEAPO×RATIO, is output and fed into the multiplication block 45. A slip SLPRTO in the torque converter 11 is given as a speed ratio between (the engine crankshaft) and (the CVT input shaft). The slip SLPRTO is used as the input to a torque converter torque ratio generator 43. The torque ratio generator 43 generates, as a function of slip SLPRTO, a torque ratio TRQRTO. The torque ratio TRQRTO is fed into the multiplication block 45, which outputs and feeds the product, TTEAPO×RATIO×TRQRTO, into the division block 46. The above-mentioned constant RTBYGF# is input into the division block 46, which divides the product, TTEAPO×RATIO×TRQRTO by RTBYGF# to output the result as the second target value TFDAPO indicative of drive force. The second target value TFDAPO may be expressed by an equation (2) as follows:

$$TFDAPO=(TTEAPO \times RATIO \times TRQRTO)/RTBYGF\#.$$

The first and second target values TFDO and TFDAPO indicative of drive force are used as the inputs to the transition controller 47. Referring to FIGS. 7 and 8A to 8E, the transition controller is responsive to the mode signal #FPTDON (see FIG. 8C) and processes these two inputs TFDO and TFDAPO to generate the drive force command TFDPTDP (see FIG. 8A). The transition controller 47 shown in FIG. 7 also generates a formation TMFDTRN (see FIG. 8B). The transition controller 47 is responsive to the formation TMFDTRN and idle switch (see FIG. 8E) and generates an integrated control mode in-operation flag #EPTDONR (see FIG. 8D).

Figure 8A:
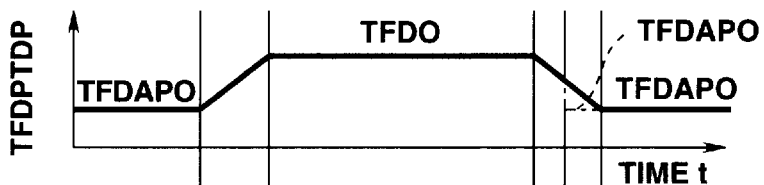
FIGS. 8A to 8E are timing diagrams showing a shift from individual control mode to integrated control mode and another shift from integrated control mode to individual control mode.
Figure 8B:
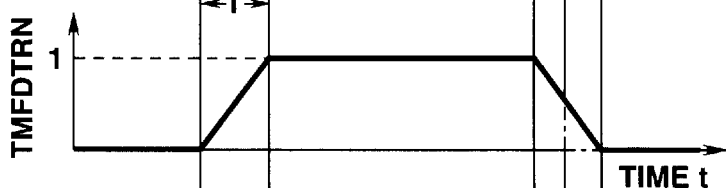
Figure 8C:
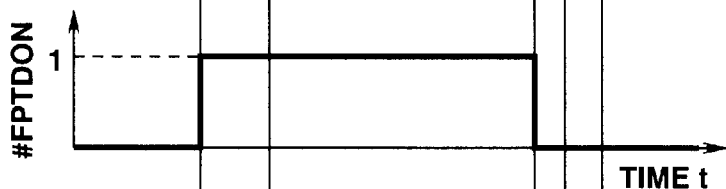
Figure 8D:
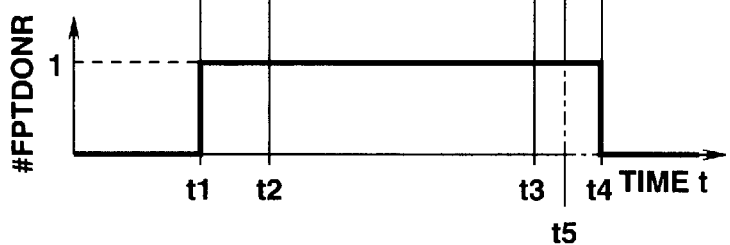
Figure 8E:
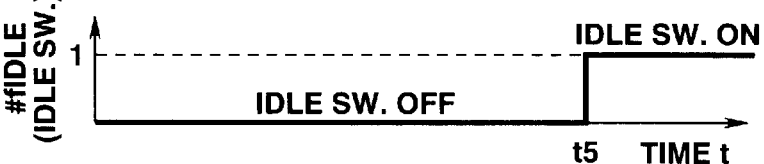
Figure 9A:
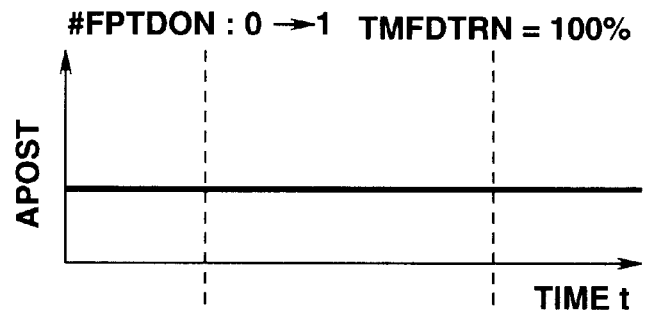
FIGS. 9A to 9D are timing diagrams showing variations of the drive force command (TFDPTDP), the ratio (RATIO) and the torque command (TTEPTD) during a shift from individual control mode to integrated control mode.
Figure 9B:
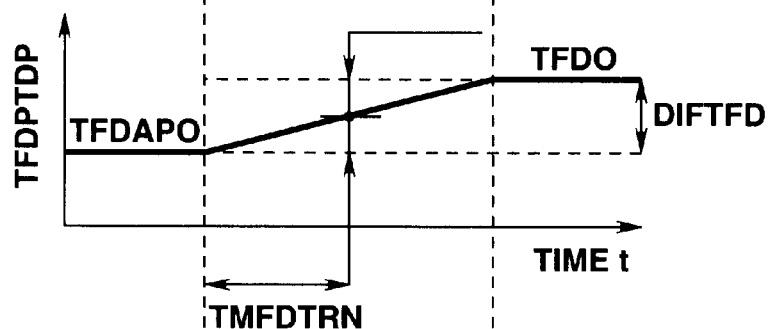
Figure 9C:
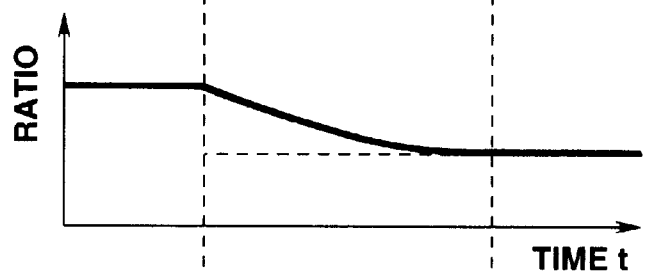
Figure 9D:
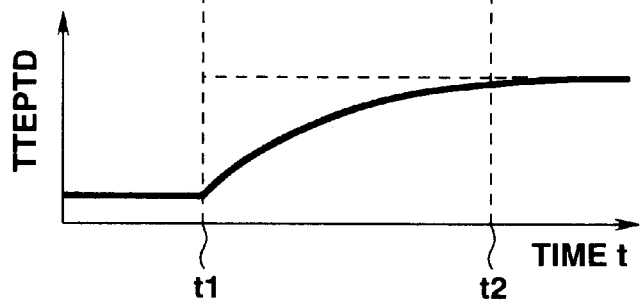

Referring to FIGS. 8A to 8E, it is now assumed that the idle switch is left turned off and idle flag #fIDLE remains at zero level. It is also assumed that the integrated control mode is in operation and the integrated control mode is out of operation prior to moment t1. It is further assumed that TFDO continues to be greater than TFDAPO and the magnitude of a difference DIFTFD between them is constant (see FIG. 10). Prior to moment t1, the formation TMFDTRN is 0%. At moment t1, the mode signal #FPTDON appears. Immediately after the moment t1, the formation TMFDTRN begins to increase from 0% toward 100%. Departure of the formation TMFDTRN from 0% causes the flag #FPTDONR to change from 0 level to 1 level. As shown in FIGS. 8B and 8D, the flag #FPTDONR remains at 1 level when the formation TMFDTRN is greater than 0% as long as the idle switch is left turned off. A transition step STPTRN is determined as a function of the difference DIFTFD and used as an increment by which the formation TMFDTRN increases from 0% toward 100%. In this case, the step STPTRN is positive. The formation TMFDTRN is used as a variable in calculating the drive force command TFDPTDP. The drive force command TFDPTDP may be expressed by an equation (2) as follows:

$$TFDPTDP=\{(100\%-TMFDTRNP) \times TFDAPO + TMFDTRN \times TFDO\}/100\%.$$

From this equation, it shall be noted that, if the formation TMFDTRN is 0%, the drive force command TFDPTDP is as high as the second target value TFDAPO of drive force, and if the formation TMFDTRN is 100%, the drive force command TFDPTDP is as high as the first target value TFDO of drive force. Thus, immediately after moment t2 at which the formation TMFDTRN reaches 100% level, the drive force command TFDPTDP is as high as the first target value TFDO of drive force.

Figure 10:
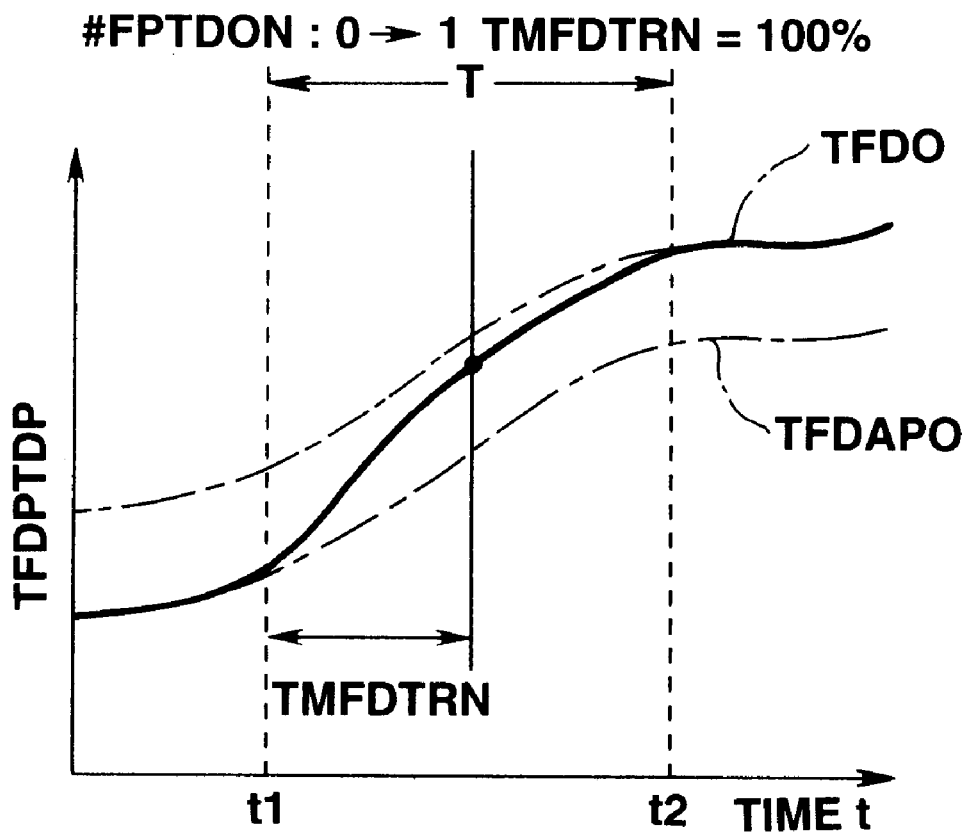
FIG. 10 is a chart showing the variation of drive force command (TFDPTDP) during a shift from individual control mode to integrated control mode.

During a transition from moment t1 to moment t2, the drive force command TFDPTDP determines torque output of the engine 1. It shall be noted from the equation (2) that the drive force command TFDPTDP may be defines as a time dependent internal division of the difference between the first and second values TFDO and TFDAPO of drive force. The time dependent internal division, which may belong to so-called "lag processing," is advantageous in that, if the difference DIFTFD between the first and second values TFDO and TFDAPO is unaltered, a time period T for a transition between the two values TFDO and TFDAPO remains the same because an increment STPTRN by which TMFDTRN varies per unit time is determined as a function of the difference DIFTFD. FIG. 10 illustrates case where the first and second values TFDO and TFDAPO vary during the transition period between t1 and t2. If, the difference DIFTFD remains the same over the transition as shown in FIGS. 9A to 9D, with the drive force command TFDPTDP expressed by the equation (2), the time period T for the transition is unaltered.

A drive force command TFDPTDP may be given by the weighted average of the first and second target values TFDO and TFDAPO, The weighted average belongs to the "lag processing." If the weighted average is used, a time period for a transition is constant as long as the first and second target values TFDO and TFDAPO remain the same over the transition period. In order to cope with the case where the first and second target values TFDO and TFDAPO vary over a transition period, varying weighted average coefficients are needed. However, even with such varying weighted average coefficients, a time period required for the transition may vary.

Turning back to FIGS. 8A to 8E, at moment t3, the mode signal #FPTDON disappears. Immediately after moment t3, the transition step STPTRN that is determined as the function of the difference DIFTFD is inverted. The inverted transition step STPTRN is negative. Thus, the transformation TMFDTRN decreases from 100% toward 0% at a rate determined by the inverted transition step STPTRN. At the subsequent moment t4, the transformation TMFDTRN reaches 0% level, causing the flag #FPTDONR to change from 1 level to 0 level. During the transition from t3 to t4, the drive force command TFDPTDP varies from the level of the first target value TFDO to the level of the second target value TFDAPO.

It is now assumed that, at moment t5, the idle switch is turned on for deceleration when the transition is in progress. In this case, the flag #FPTDONR changes to 0 level, causing the transformation TWFDTRN to drop down to 0%. Thus, the drive force command TFDPTDP takes the level as high as the second target value TFDAPO of drive force immediately after the idle switch has been turned on at moment t5.

The one-dot chain line in FIGS. 8A, 8B and 8D illustrates the above described changes at moment t5.

Figure 7:
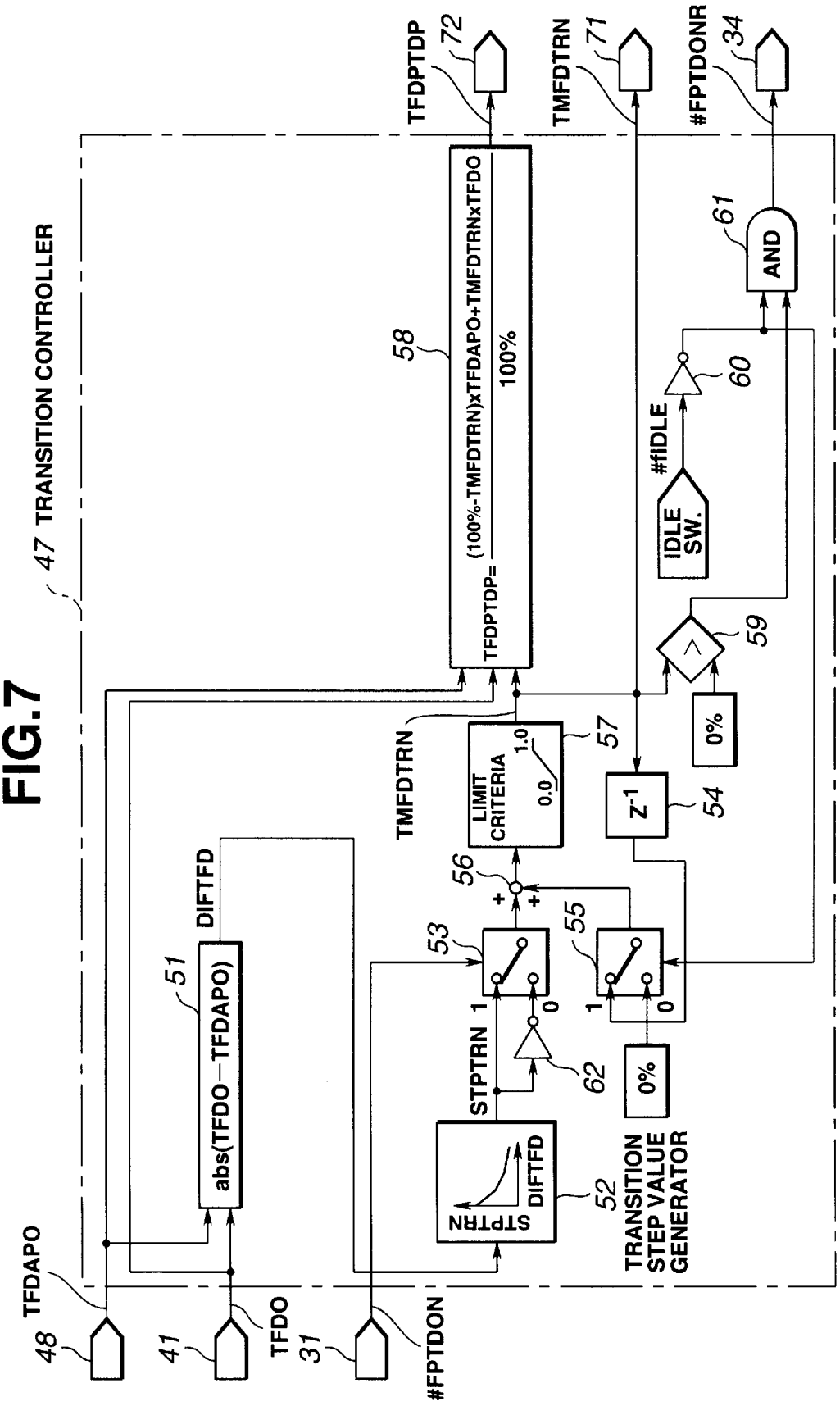
FIG. 7 is a block diagram of the transition controller.

Referring to FIG. 7, the transition controller 47 used in the preferred implementation of the present invention is described. The first and second target value TFDO and TFDAPO are input to a subtraction block 51 and also to a calculation block 58. The subtraction block 51 calculates an absolute value of a difference between the first and second target values TFDO and TFDAPO. The difference DIFTFD generated by the subtraction block 51 is fed as the input to a transition step generator 52. The transition step generator 52 generates, as a function of the difference DIFTFD, a transition step STPTRN. The transition step generator 52 may consist of a look-up table in computer memory. Controlling the magnitude of transition step STPTRN controls the rate (or speed) at which transformation TMFDTRN varies, thus controlling speed of progress during a transition between the first and second target values TFDO and TFDAPO of drive force. According to this preferred implementation, the greater the difference DIFTFD is, the lesser the transition step STPTRN is. As a result, the rate at which the drive force command TFDPTDP varies decreases as the magnitude of a difference between the first and second target values TFDO and TFDAPO of drive force increases. This setting is advantageous in that a smooth transition without any substantial shock is assured even if there exists a substantial difference between the first and second target values TFDO and TFDAPO of drive force at the initiation of the transition.

The transition step STPTRN is fed to a first input of a switch 53 and also to an inverter 62. The output of the inverter 62 is fed to a second input of the switch 53. The mode signal #EPTDON is applied to the switch 53. Upon appearance of the mode signal when #FPTDON=1, the switch 53 is in the illustrated position and outputs the transition step STPTRN, which is positive, to a summation point 56. Upon disappearance of the mode signal when #FPTDON=0, the switch 53 outputs the inverted transition step STPTRN, which is negative, to the summation point 56. A current value of transformation TMFDTRN is fed through a delay block 54 to a first input of a switch 55. The delay block 54 outputs its input as an old value of transformation $TMFDTRN_{old}$. The value 0% is fed to a second input of the switch 55. The idle flag #fILDE that is controlled by the idle switch is fed through an inverter 60 to the switch 55. The inverted version of idle flag #fIDLE is at 0 level when the idle switch is turned on, and it is at 1 level when the idle switch is turned off. Thus, the switch 55 outputs the old value $TMFDTRN_{old}$ to the summation block 56 when the idle switch is turned off, and it output the value 0% to the summation block 56 when the idle switch is turned on. The summation block 56 adds the values from the switches 56 and outputs the sum to a limiting block 57 where the output of the summation block 56 is limited between 0% and 100%. The transformation TMFDTRN, which is output by the limiting block 57, is fed to the calculation block 58. The calculation block 58 calculates the drive force command TFDPTDP as the time dependent internal division as expressed by the equation (2).

Let us now consider a transition from the individual control mode to the integrated control mode. The mode signal #FPTDON is at 1 level during this transition. Thus, the summation block 56 repeats summation as expressed by an equation (3) as follows:

$$TMFDTRN=TMFDTRN_{old}+STPTRN.$$

Thus, the transformation TMFDTRN increases at the rate of STPTRN toward 100%.

Next, let us consider a transition from the integrated control mode to individual control mode. The mode signal #FPTDON is at 0 level during this transition. Thus, the summation block 56 repeats summation as expressed by an equation (4) as follows:

$$TMFDTRN=TMFDTRN_{old}-STPTRN.$$

Thus, the transformation TMFDTRN decreases at the rate of STPTRN toward 0%.

Figure 11:
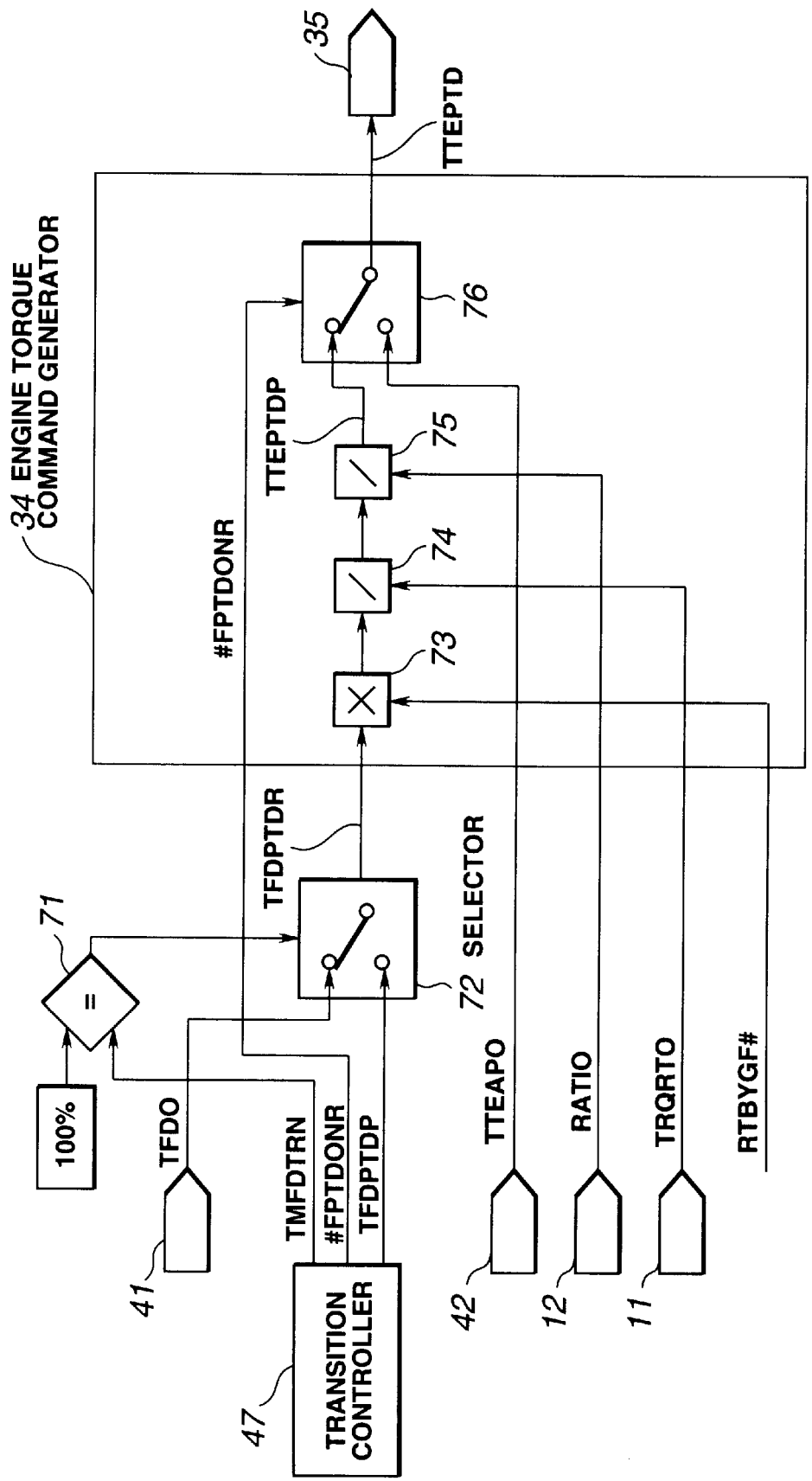
FIG. 11 is a block diagram of an engine torque command generator.

The limiting block 57 feeds the transformation TMFDTRN to the delay block 54, a comparison block 59 and a selector 72 shown in FIG. 11.

The flag #FPTDONR is controlled by the comparison block 59, inverter 60 and an AND gate 61. The comparison block 59 compares the transformation TMFDTRN with another input of 0%. The comparison block 59 outputs 1 level when TMFDTRN is greater than 0%, and it outputs 0 level when TMFDTRN is equal to 0%. The output of the comparison block 59 and the output of the inverter 60 are used as the inputs to the AND gate 61. The AND gate 61 outputs, as the flag #FPTDONR, 1 level when and only when TMFDTRN is greater than 0% and the idle switch is turned off. The AND gate 61 outputs 0 level when the transformation TMFDTRN is equal to 0% and/or the idle switch is turned on.

Let us now consider the case where the idle switch is turned on when the transformation TMFDTRN is being calculated. This causes the mode signal #FPTDON to take 0 level and the output of the inverter 60 to take 0 level, causing the switch 53 to output −STPTRN (%) and the switch to output 0%. Thus, the output of the summation point 56 becomes −STPTRN (%), which is limited at the limiting block 57. Thus, the transformation TMFDTRN, which is the output of the limiting block 57, becomes 0%. As a result, the drive force command TFDPTDP generated as the output of the calculation block 58 becomes as high as the second target value TFDAPO of drive force. Thus, if the idle switch is turned on during a transition from the integrated control mode to the individual control mode, the drive force command TFDPTDP takes a level as high as the second target value TFDAPO of drive force.

The reason why the individual control mode is selected immediately after the idle switch has been turned on is that, during deceleration initiated by turning on the idle switch, the first target force TFDAPO becomes negative and thus the engine torque command become negative. The accuracy of torque control of the engine to accomplish the negative torque is poor. Thus, the individual control mode is preferred. If the individual control mode is used during deceleration, sufficiently high engine braking effect may be accomplished by controlling the CVT ratio. Engine braking effect may be further increased by locking up the torque converter 11 or controlling torque transmission capacity of a lock-up clutch in the torque converter 11. JP-A 6-87356 discloses engine-braking operation by locking up a torque converter. JP-A 9-267664 discloses engine-braking operation by controlling torque transmission capacity of a clutch.

Referring next to FIG. 11, the engine torque command generator 34 used in the preferred implementation is described. As described before in connection with FIG. 2, the drive force command TFDPTDP is fed to the engine torque command generator 34, which calculates the engine torque command TTEPTD as a function of the drive force command TFDPTDP. Specifically, the engine torque command TTEPTD is given by TFDPTDP×RTBYGF#× (TRQRTO×RATIO)$^{-1}$. As shown in FIGS. 8A and 8B, the drive force command TFDPTDP that is generated by the transition controller 47 takes one level as high as the first target value TFDO of drive force when the transformation TMFDTRN is 100% and takes another level as high as the second target value TFDAPO of drive force when the transformation TMFDTRN is 0%. It shall be noted that the engine torque command TTEPTD that is given as above may be used for the torque control of the engine 1 over the whole range of variations of the transformation TMFDTRN.

In the example of FIG. 11, the drive force command TFDPTDP is fed via a selector 72 to the engine torque command generator 34. The drive force command TFDPTDP is used as one input of the selector 72. The first target value TFDO is the other input to the selector 72. The transformation TMFDTRN is used as one input of a comparator 71 whose output is applied to the selector 72. A value of 100% is used as the other input of the comparator 71. The comparator 71 compares the transformation TMFDTRN with 100% and outputs 1 level when TMFDTRN is equal to 100% or 0 level when TMFDTRN is less than 100%. In response to the 0 level output of the comparator 71, the selector 72 takes a position wherein the drive force command TFDPTDP is input into the engine torque command generator 34 as a final drive force command TFDPTDR. In response to the 1 level output of the comparator 71, the selector 72 takes the illustrated position wherein the first target value TFDO of drive force is input into the engine torque command generator 34 as the final drive force command TFDPTD. The drive force command TFDPTDP takes the level as high as the first target value TFDO of drive force when the transformation TMFDTRN=100%. In this example, when TMFDTRN=100%, the first target value TFDO of drive force is used instead of TMFDTRN in order to avoid operation error that may be involved in TMFDTRN.

The final drive force command TFDPTDR is subject to multiplication at fed to a multiplication block 73 and division blocks 74 and 75 to give a target engine torque TTEPTDP. The target engine torque TTEPTDP is calculated as a function that may be expressed as an equation (5) as follows:

$$TTEPTDP=TFDPTDR\times TRBYGF\#/(TRQRTO\times RATIO).$$

The multiplication block 73 and division blocks 74 and 75 perform this calculation. The target engine torque TTEPTDP is used as one input to a switch 76. The target value TTEAPO of engine torque generated at the block 42 (see FIG. 2) is used as the other input to the switch 76. The flag #FPTDONR, which takes 0 level during the individual control mode, is applied to the switch 76. When the flag #FPTDONR is at 1 level, the switch 76 takes the illustrated position wherein the calculated target engine torque TTEPTDP is output as the torque command engine. When the flag #FPTDONR is at 0 level, the switch 76 take a position wherein the target value TTEAPO of engine torque is output as the torque command TTEPTD. Theoretically, the target engine torque TTEPTDP becomes equal to the target value TTEAPO of engine torque when the flag #FPTDONR is 0%. However, operational errors may be involved. Thus, when the individual control mode is used, the target value TTEAPO of engine torque is output as the torque command TTEPTD.

One example of how a controller 21 would implement the present invention can be understood with reference to FIGS. 12–14 and 16–20. The flow charts in FIGS. 12–14 and 16–20 illustrate a control routine of the preferred implementation of the present invention.

Figure 12:
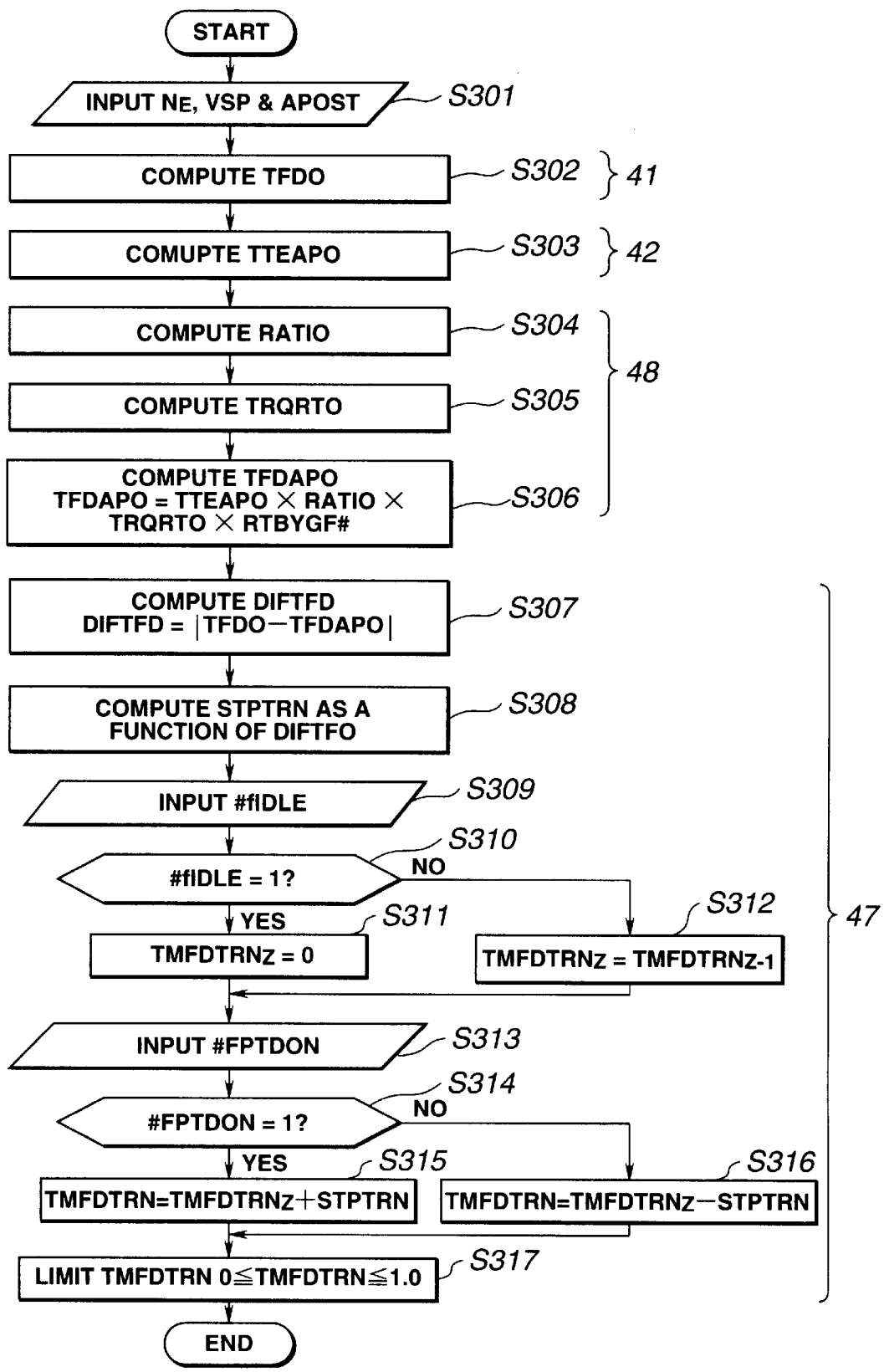
FIG. 12 is a flow chart of a subroutine of a control routine implementing the present invention, showing processing to determine transformation (TMFDTRN).

FIG. 12 is a flow chart of a subroutine illustrating how the controller 21 would implement jobs at the drive force request command generator 41, engine torque request command generator 42, drive force calculation generator 48 and transition controller 47. This subroutine is executed at an regular interval of 10 milliseconds.

In input step S301, the controller receives input information of engine speed $N_E$, vehicle speed VSP, and accelerator depressed position APOST, which indicates the vehicle operator's desired relative to movement of the vehicle.

In step S302, the controller computes the first target value TFDO of drive force by table look-up operation of the look-up table using VSP and APOST. In step S303, the controller computer the target value TTEAPO of engine torque by table look-up operation of the look-up table using $N_E$ and APOST.

Figure 13:
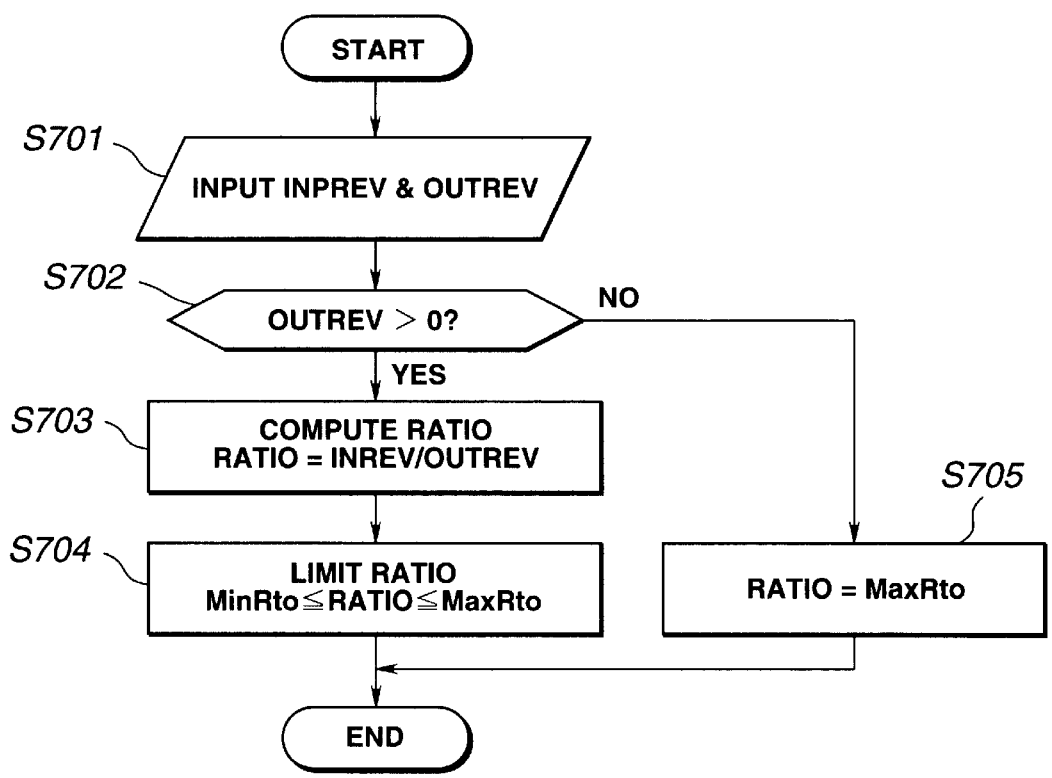
FIG. 13 is a flow chart of a subroutine of the control routine, showing processing to determine the ratio (RATIO).

In step S304, the controller computes actual CVT ratio RATIO by executing a subroutine shown in FIG. 13. In step S305, the controller computes the torque ratio TRQRTO within the torque converter 11 by executing a subroutine shown in FIG. 14. In step S306, the controller computes the second target value TFDAPO of drive force by calculating the equation TFDAPO=TTEAPO×RATIO×TRQRTO/RTBYGF#.

Figure 14:
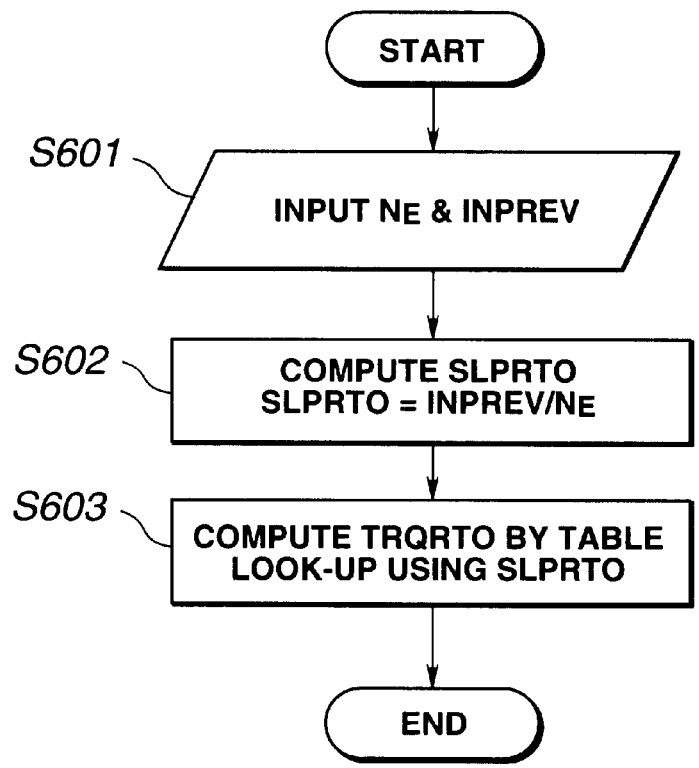
FIG. 14 is a flow chart of a subroutine of the control routine, showing processing to determine the amplification in terms of torque ratio (TRQRTO).

The subroutines shown in FIGS. 13 and 14 are described. The flow chart in FIG. 13 illustrates how the controller calculates the ratio RATIO. The flow chart in FIG. 14 illustrates how the controller calculates the torque ratio TRQRTO.

In step S701 in FIG. 13, the controller receives input information the CVT input shaft speed INREV and CVT input shaft speed OUTREV. In step S702, the controller determines whether or not the CVT output shaft speed OUTREV is greater than 0 (zero). If this is the case (OUTREV>0), then the controller computes the ratio RATIO at step S703 by dividing INREV by OUTREV. In step S704, the controller imposes the limit on the ratio RATIO. The maximum limit is MaxRto and the minimum limit is MinRto. If the CVT output shaft speed is equal to 0, the subroutine proceeds from step S702 to step S705. In step S705, the controller sets the ratio RATIO equal to the maximum limit MaxRto. The CVT output shaft speed OUTREV fails to be greater than 0 when the vehicle travels at vehicle speed of 2 to 3 Km/h. If the CVT output shaft speed OUTREV is in the nationhood of 0 (zero), the computation of the division INREV/OUTREV is difficult. The CVT ratio established is the maximum ratio. Thus, the ratio RATIO is set equal to MaxRto if OUTREV is equal to 0.

Figure 15:
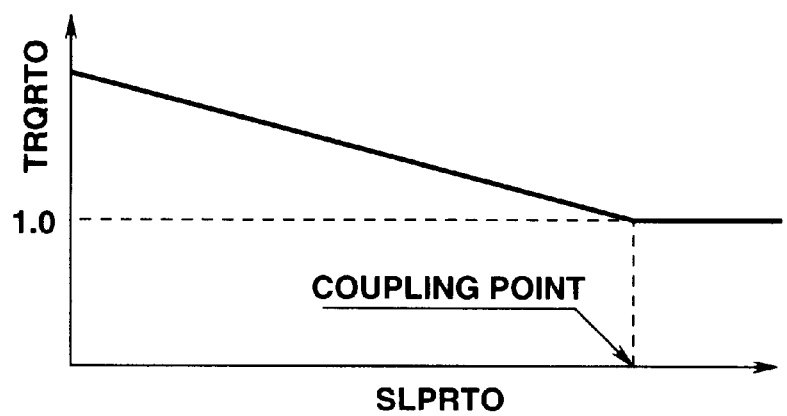
FIG. 15 is a chart showing variation of the torque ratio (TRQRTO).

In step S601 in FIG. 14, the controller receives input information of engine speed $N_E$ and CVT input shaft speed INPREV. In step S602, the controller computes slip SLPRTO as a speed ratio INPREV/$N_E$. In step S603, the controller computes the torque ratio TRQRTO by table look-up of the look-up table shown in FIG. 15 using the slip SLPRTO.

Turning back to FIG. 12, the controller computers the difference DIFTFD as the absolute value of subtraction of the second target value TFDAPO from the first target value TFDO. In step S308, the controller computes the transition step value STPTRN by a table look-up operation of the look-up table using the difference DIFTFD. In step S309, the controller receives the idle flag #fIDLE. In step S310, the controller determines whether or not the idle flag #fIDLE is at 1 level. If this is the case (the idle switch is turned on), a current value TMFDTRN$_Z$ is cleared at step S311. If the idle flag #fIDLE is at 0 level in step S310, the subroutine proceeds to step S312. In step S312, the controller sets the current value TMFDTRN$_Z$ equal to an old value TMFDTRN$_{Z-1}$. In step S313, the controller input the mode signal or mode change flag #FPTDON. In step S314, the controller determines whether or not the flag #FPTDON is at 1 level. If this is the case, the controller updates, at step S315, the transformation TMFDTRN by performing an increment by STPTRN. If the flag #FPTDON is at 0 level, the controller updates, at step S316, the transformation TMFDTRN by performing an increment −STPTRN. In step S317, the controller imposes a limit on the transformation TMFDTRN within a window with a lower limit 0 (or 0%) and an upper limit 1.0 (100%).

Figure 16:
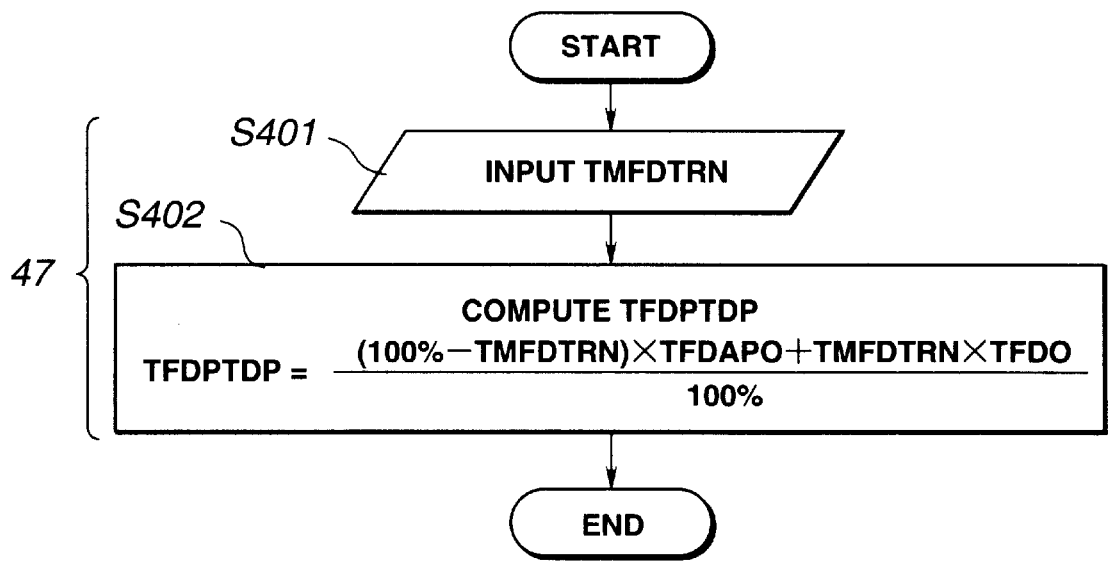
FIG. 16 is a subroutine of the control routine, showing calculation to determine the drive force command (TFDPTDP).

The flow chart in FIG. 16 illustrates a subroutine for the controller to calculate the drive force command TFDPTDP. This subroutine is executed at a regular interval after the subroutine in FIG. 12. In step S401, the controller inputs the transformation TMFDTRN. In step S402, the controller computes the drive force command TFDPTDP by calculating the equation (2).

Figure 17:
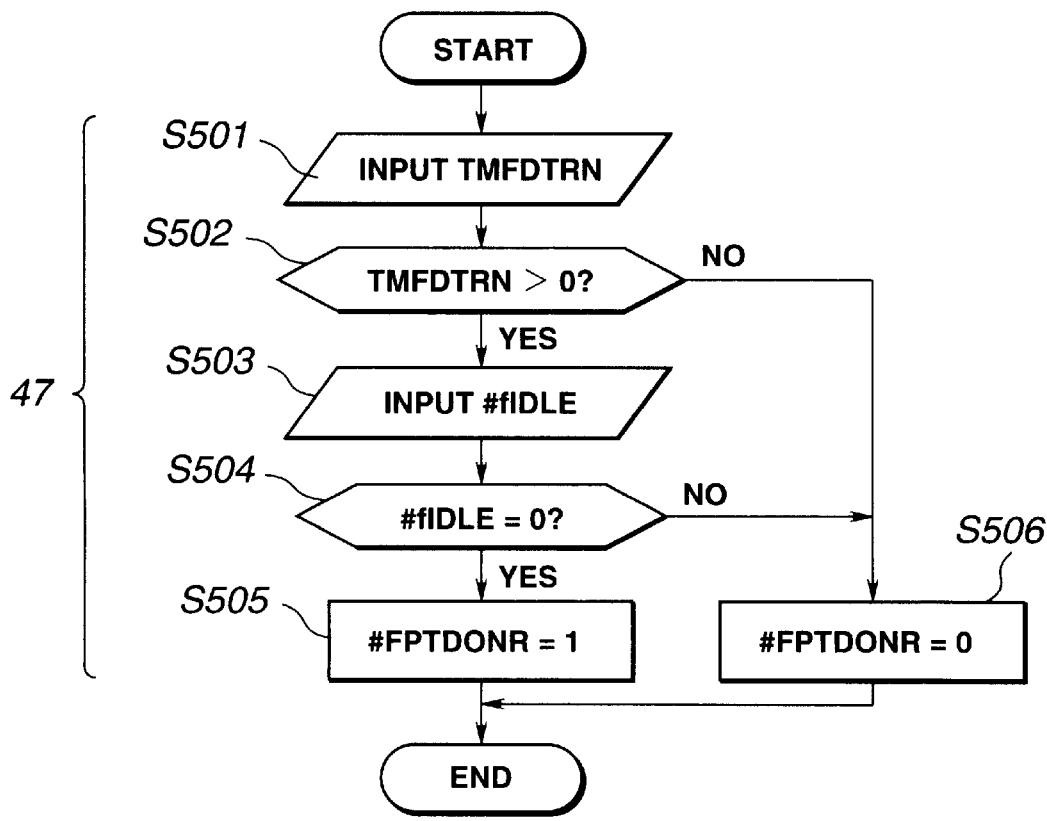
FIG. 17 is a subroutine of the control routine, showing the integrated control in-operation flag (#FPTDONR).

The flow chart in FIG. 17 illustrates a subroutine for the controller to control the status of the flag #FPTDONR. This subroutine is executed at a regular interval after the subroutine in FIG. 12. In step S501, the controller inputs the transformation TMFDTRN. In step 502, the controller determines whether or not the transformation TMFDTRN is greater than 0 (zero). If this is the case, the controller inputs, at step S503, the idle flag #fIDLE. In the next step S504, the controller determines whether or not the idle flag #fIDLE is at 0 level. If this is the case, the controller sets, at step S505, the flag #FPTDONR equal to 1 (one). If the transformation TMFDTRN is equal to 0, the controller resets the flag #FPTDONR at step S506. If the idle flag #fIDLE is at 1 level, the controller resets the flag #FPTDONR at step S506. It shall be noted that the subroutines 16 and 17 illustrate how the controller implement jobs performed at the transition controller 47 shown in FIG. 7.

Figure 18:
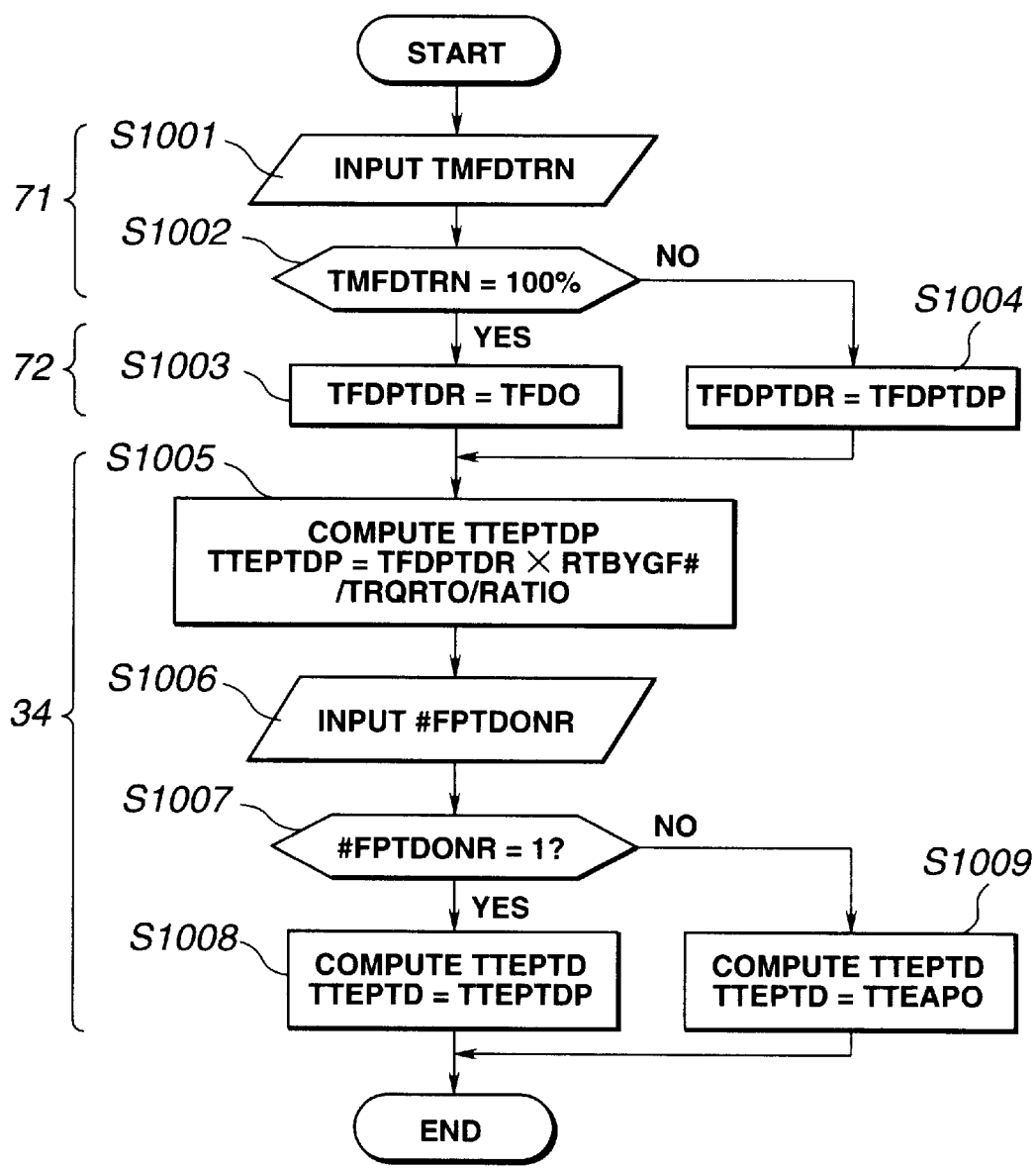
FIG. 18 is a subroutine of the control routine, showing calculation to determine the target command (TTEPTD).

The flow chart in FIG. 18 shows a subroutine for the controller to determine the engine torque command TTEPTD, illustrating how the controller would implement the jobs at blocks 71, 72 and 34 (see FIG. 2). In step S1001, the controller inputs the transformation TMFDTRN. In the next step S1002, the controller determines whether or not the transformation TMFDTRN is equal to 100%.

If this is the case, the controller sets, at step S1003, the first target value TFDO of drive force as the final drive force command TFDPTDR. If the transformation TMFDTRN is less than 100%, the controller sets, at step S1004, the drive force command TFDPTDP as the final drive force command TFDPTDR.

In the next step S1005, the controller computes the target engine torque TTEPTDP by calculating the equation (5). In step S1006, the controller inputs the flag #FPTDONR. In step S1007, the controller determines whether or not the flag #FPTDONR is at 1 level. If this is the case, the controller sets, at step S1008, the target drive force TTEPTDP as the engine torque command TTEPTD. If the flag #FPTDONR is at 0 level, the controller sets, at step S1009, the target value TTEAPO of engine torque as the engine torque command TTEPTD.

Figure 19:
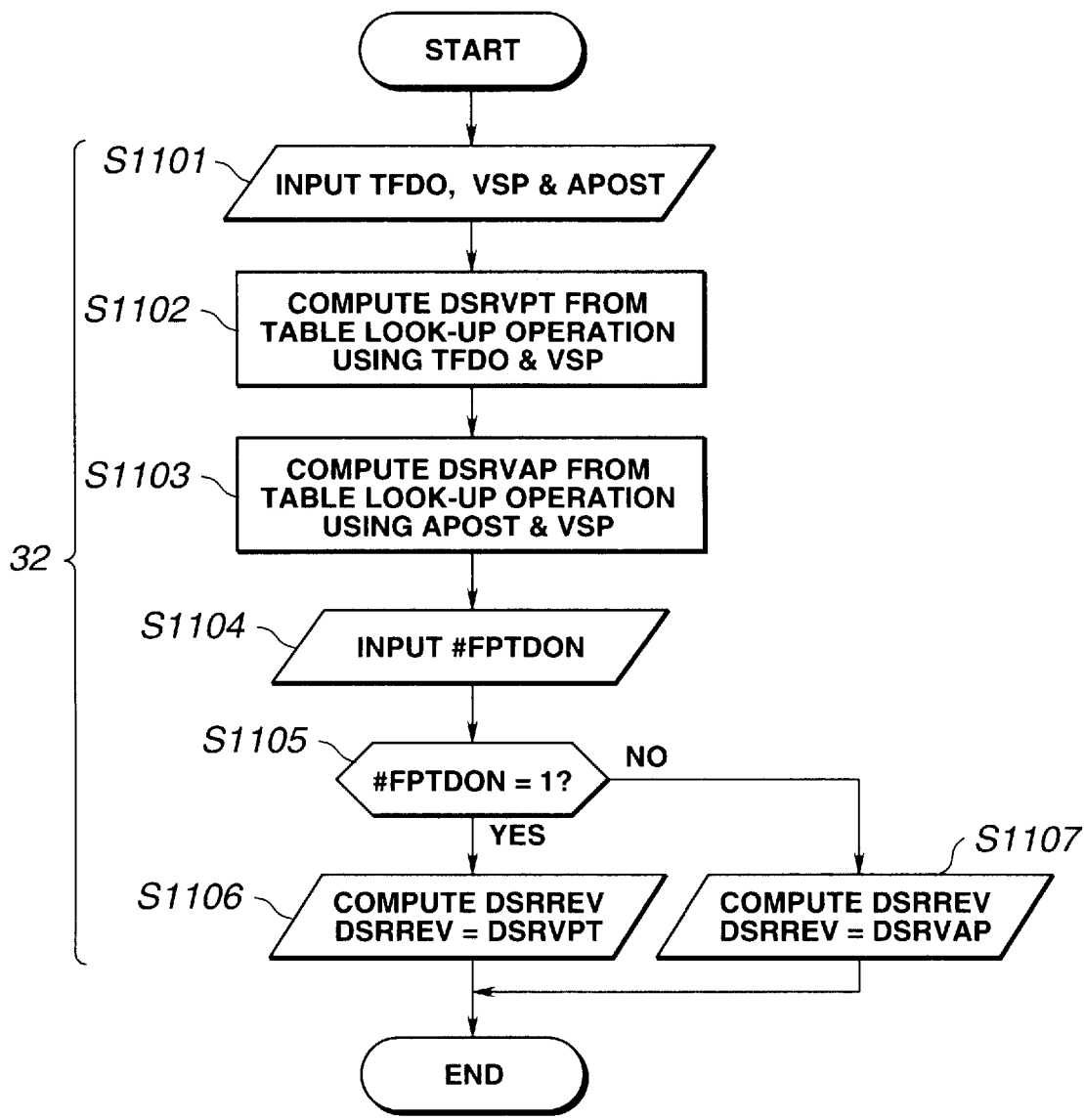
FIG. 19 is a subroutine of the control routine, showing the target speed (DSRREV) of the CVT.

The flow chart in FIG. 19 shows a subroutine for the controller to determine speed command DSRREV, illustrating how the controller would implement the jobs at the block 32 (see FIG. 5). This subroutine is executed at a regular interval. In step S1101, the controller inputs the first target value TFDO of drive force, vehicle speed VSP and accelerator depressed position APOST. In step S1102, the controller computes the first target value DSRVPT of the CVT input shaft speed by a table look-up operation of the look-up table using TFDO and VSP. In the next step, the controller computes the second target value DSRVAP of the CVT input shaft speed by a table look-up operation of the look-up table using VSP and APOST. In step S1104, the controller inputs the mode signal or mode change flag #FPTDON. In step S1105, the controller determines whether or not the mode change flag #FPTDON is at 1 level. If this is the case, the controller sets, at step S1106, the first target value DSRVPT of the CVT input shaft speed as the speed command DSR-REV. If this is not the case, the controller sets, at step S1107, the second target value DSRVAP of the CVT input shaft speed as the speed command.

Figure 20:
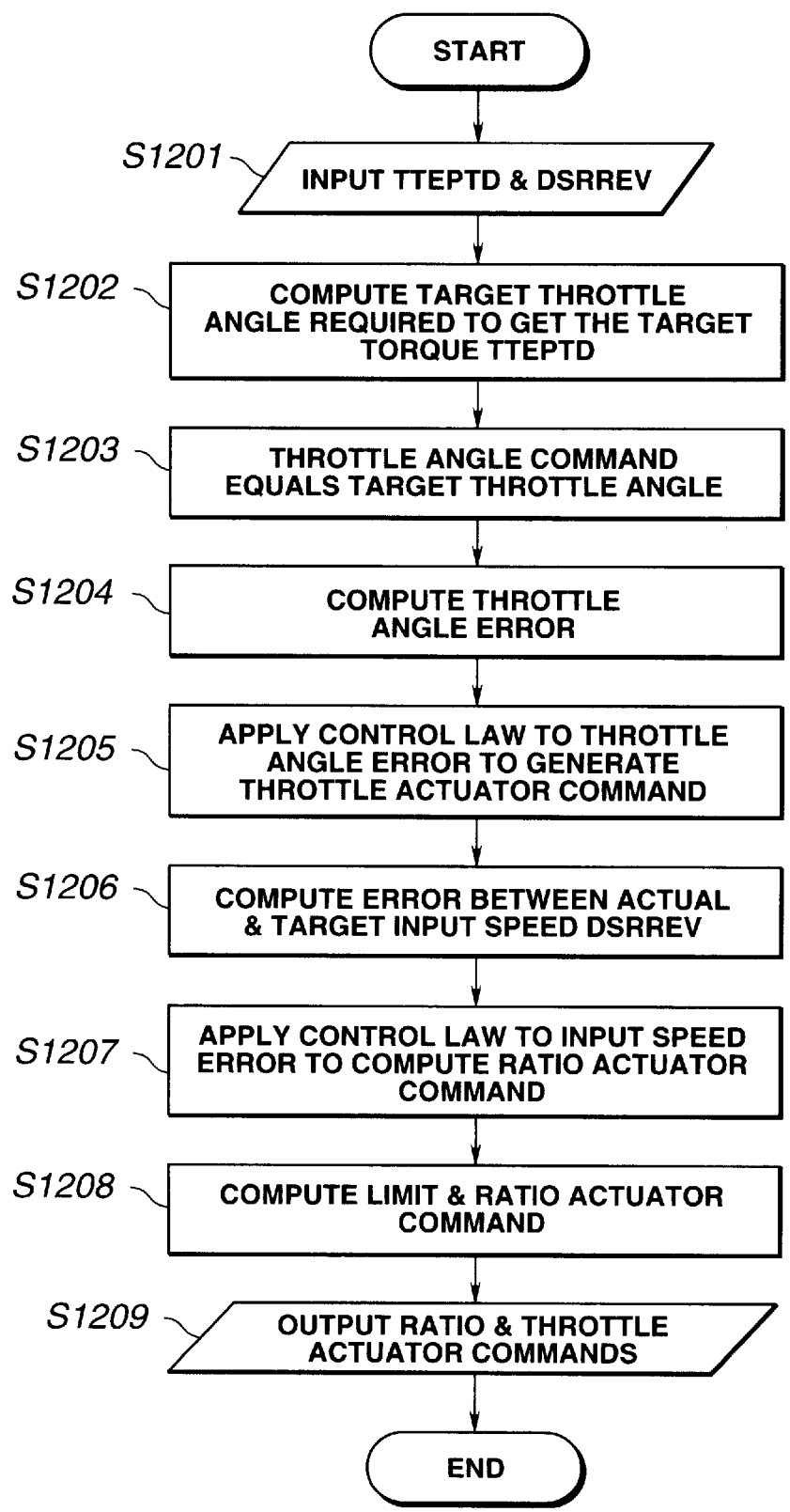
FIG. 20 is a subroutine of the control routine, showing processing to determine ratio actuator command and throttle actuator command.

The flow chart in FIG. 20 shows a subroutine, illustrating one example how the controller would determine the CVT ratio actuator command and the throttle actuator command to accomplish the engine torque command and the speed command. This subroutine is executed at a regular interval. In step S1201, the controller inputs the engine torque command TTEPTD and the speed command DSRREV. In step S1202, the controller computes target throttle angle or position required to get the target torque indicated by the engine torque command TTEPTD by performing a table look-up operation of an appropriate look-up table. In step S1203, the controller sets the target throttle angle as throttle angle command. In step S1204, the controller computes the error between the target throttle angle and the actual throttle angle. In step S1205, a simple control routine is used to compute the throttle actuator command. In step S1206, the controller computes the error between the target speed indicated by the speed command DSRREV and the actual CVT input shaft speed. In step S1207, a simple control routine is utilized to compute the ratio actuator command. In step S1208, the controller compute limits to be imposed to the ratio actuator command. In step S1209, the limited ratio actuator command and the throttle actuator command are output.

Figure 22:
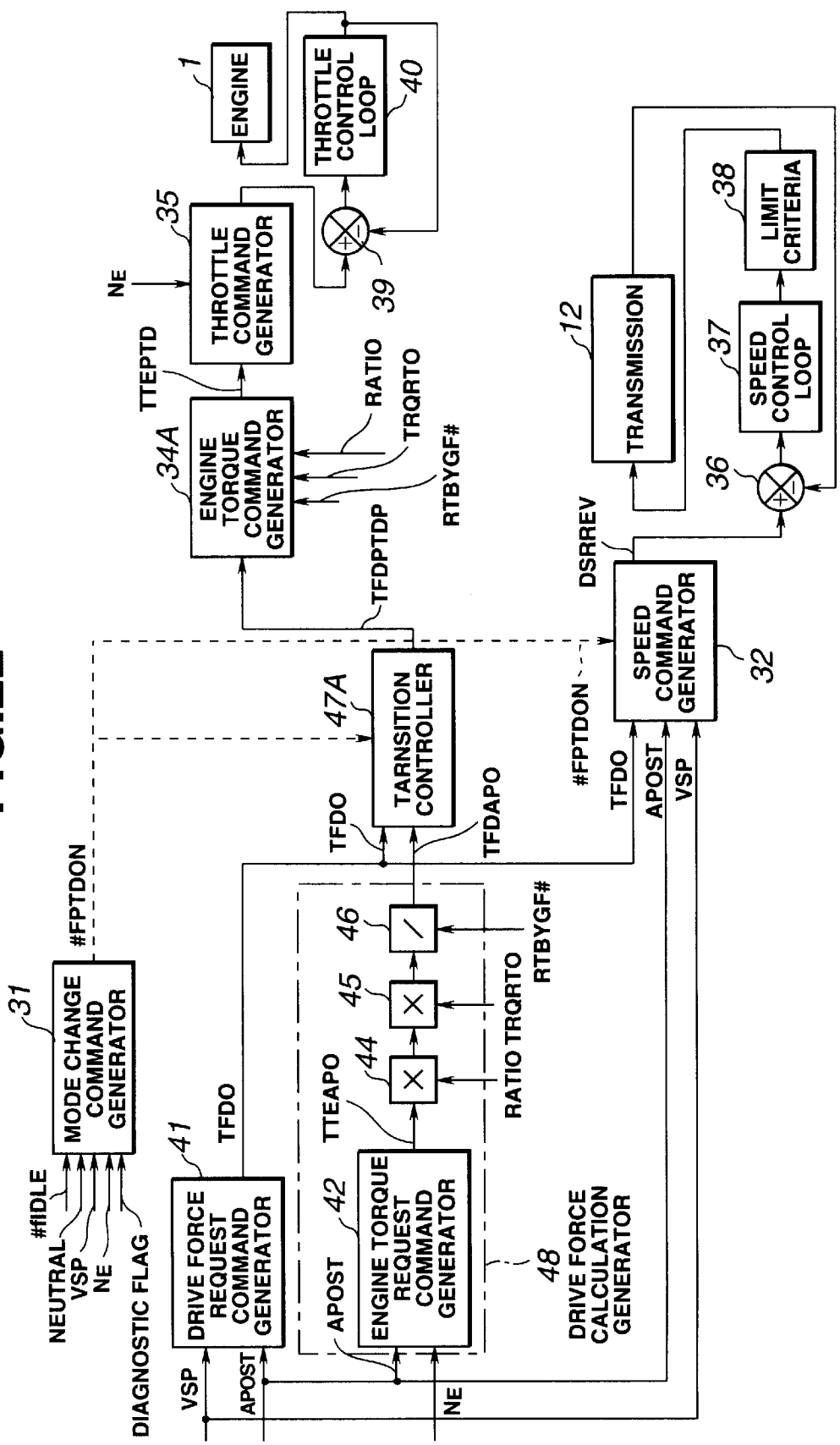
FIG. 22 is a controls diagram similar to FIG. 2 illustrating a further implementation of the present invention.
Figure 23:
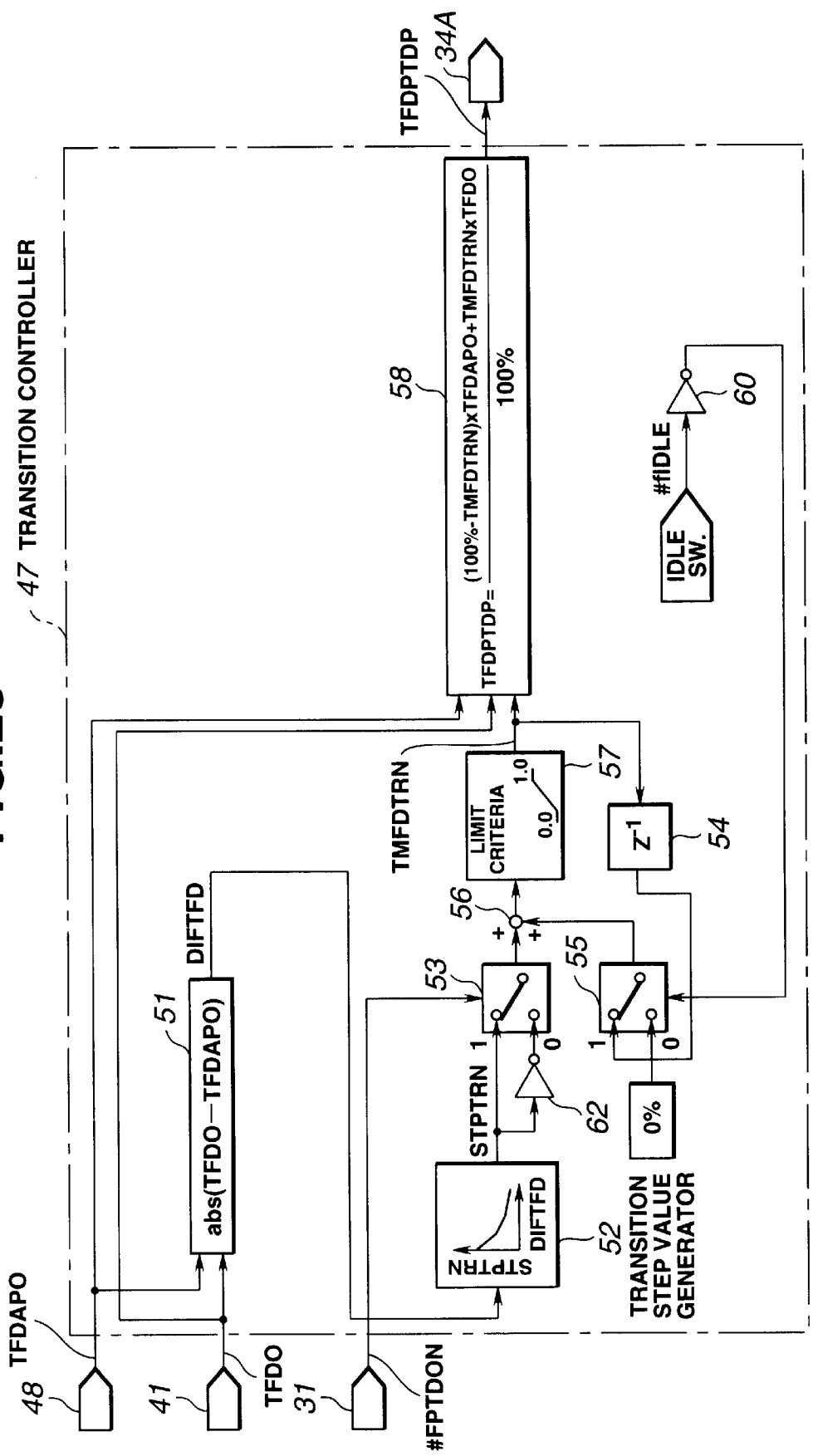
FIG. 23 is a block diagram of a transition controller used in FIG. 22.
Figure 24:
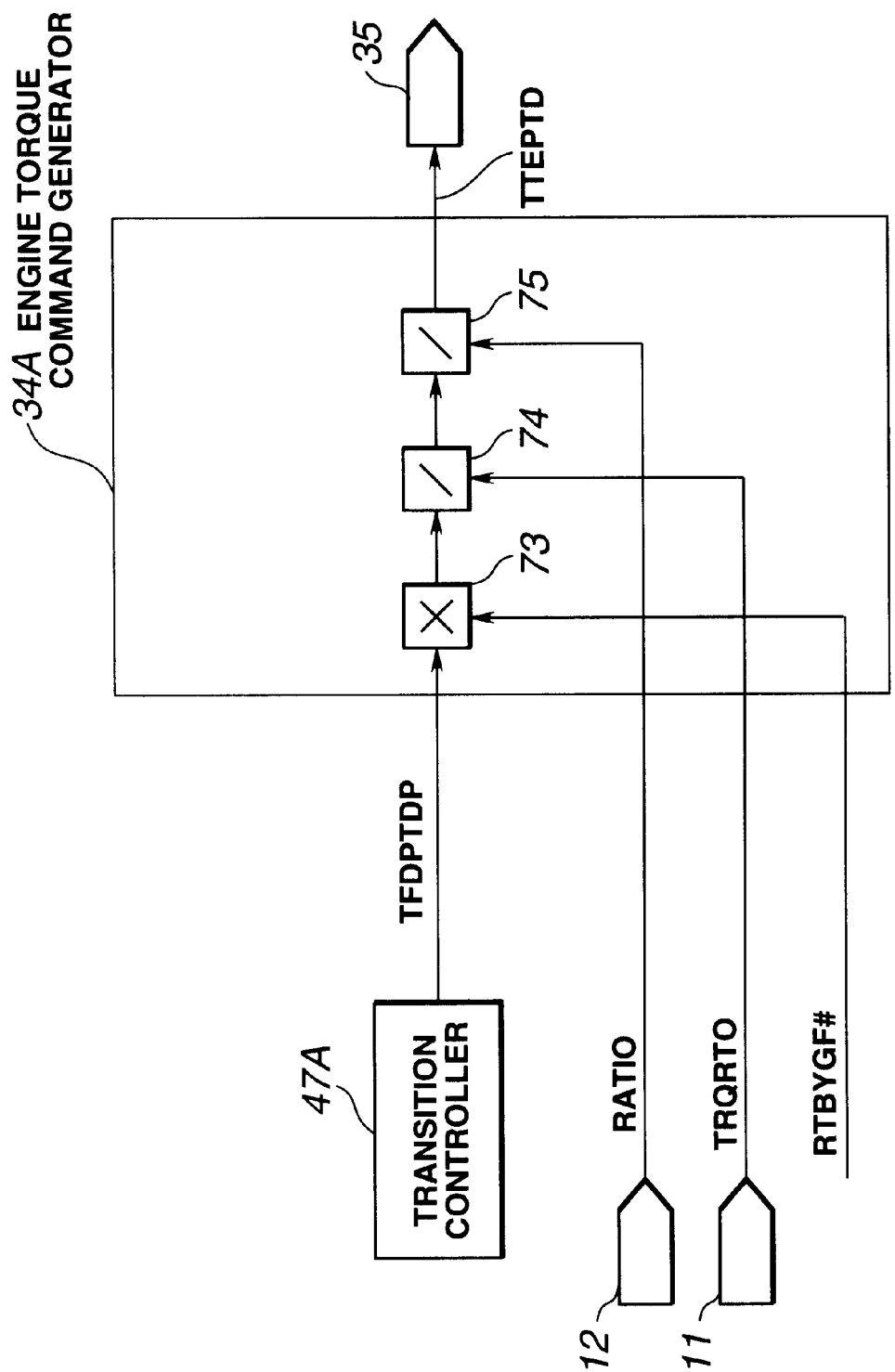
FIG. 24 is a block diagram of an engine torque command generator used in FIG. 22.

Referring to FIGS. 22, 23 and 24, a simplified version of the implementation of the invention is described. This implementation is substantially the same as the first mentioned preferred implementation shown in FIGS. 1 to 20. A difference resides in that a drive force command TFDPTDP that is generated by a transition controller 47 is always used as the input into an engine torque command generator 34A, which generates an engine torque command TTEPTD as a function of the drive force command TFDPTDP over the integrated and individual control modes.

Figure 21:
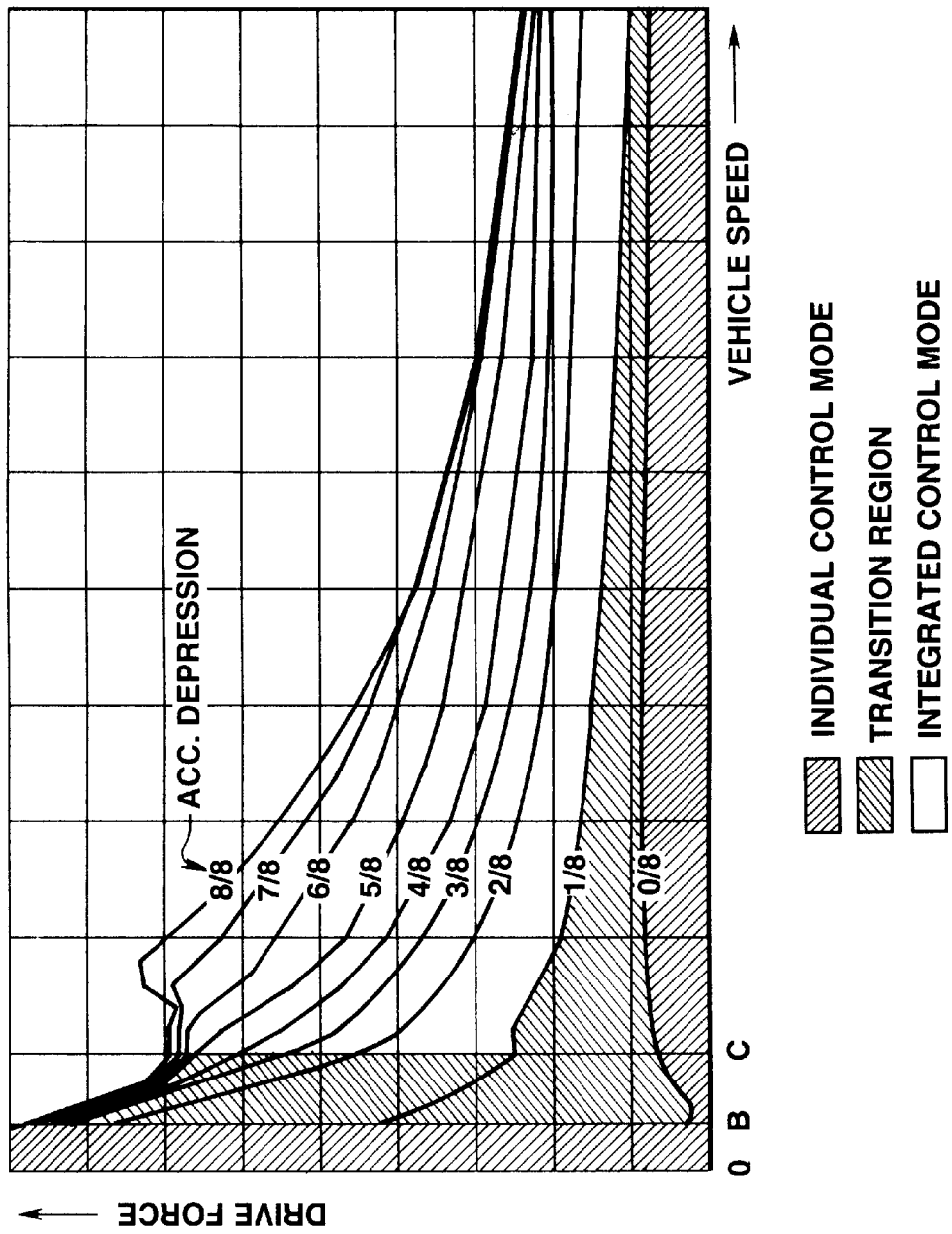
FIG. 21 is a drive force map illustrating integrated control mode including a transition region adjacent to individual control mode.

FIG. 21 is a drive force map illustrating a two-dimensional look-up table that may be used at the drive force request command generator 41. The map contains, as the first target value TFDO indicative of drive force, data, which are indicative drive force generated by operation of an engine 1 and operation of a CVT 12 during individual control mode within a boundary zone, namely, a transition region, of the integrated control mode region. The boundary zone defines a border of the integrated control mode with the individual control mode region. This arrangement has proved to be effective in minimizing the difference DIFTFD, thus improving the transition operation. This map illustrated in FIG. 12 is utilized for a transition from the individual control mode to the integrated control mode. For a transition from the integrated control mode to the individual control mode, such a boundary zone should be located within the individual control mode and the data indicative of drive force generated by engine and CVT during the integrated control mode should be arranged in this boundary zone.

Figure 25:
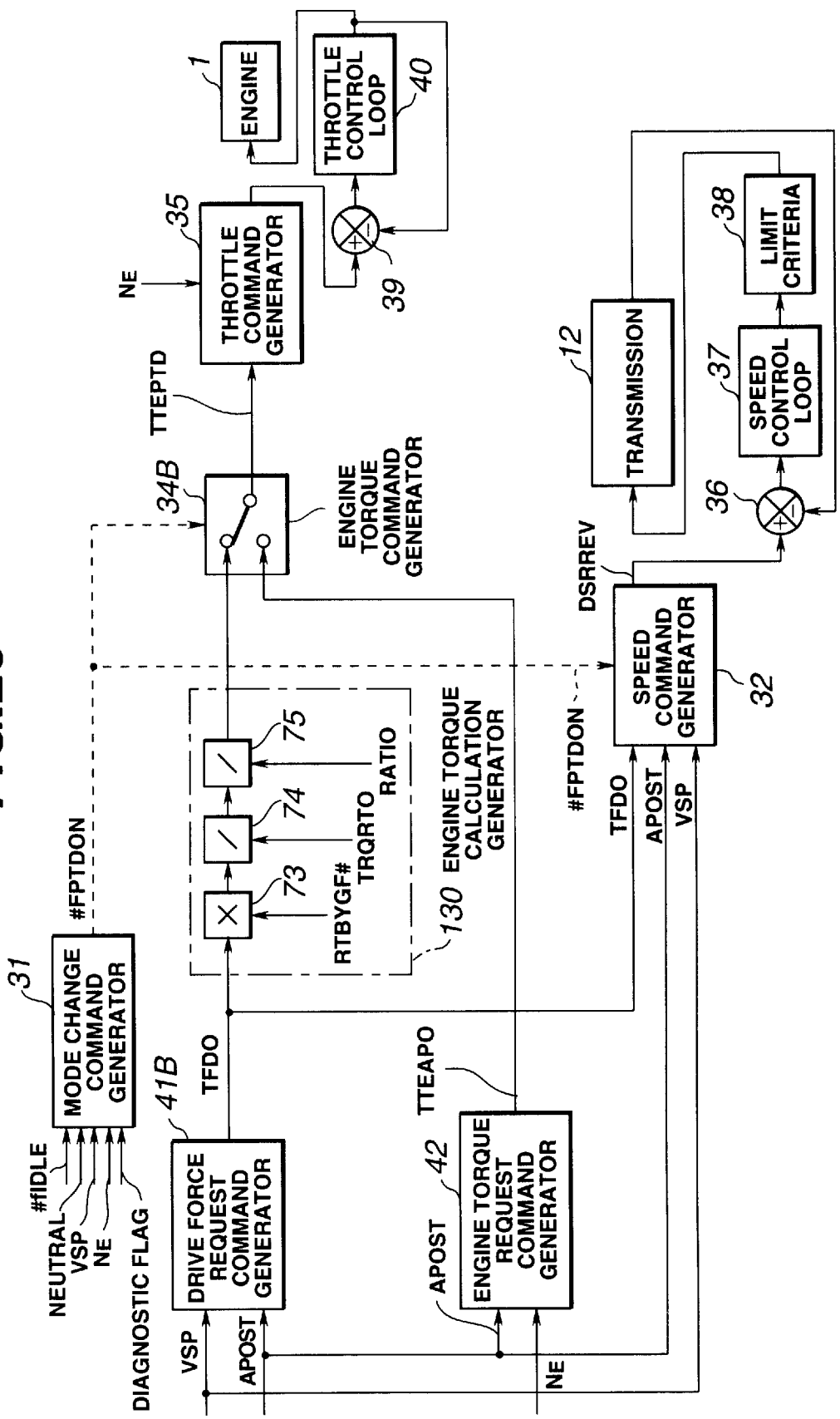
FIG. 25 is a controls diagram similar to FIG. 22 illustrating another implementation of the present invention.

The controls diagram in FIG. 25 is used to illustrate another implementation of the present invention. In this implementation, the map as illustrated in FIG. 21 is utilized in a drive force request command generator 41B. A first target value TFDO of drive force for operation in integrated control mode is subjected to calculation at an engine torque calculation generator 130. The output of this generator 130 is used as an input of an engine torque command generator 34b. A target value TTEAPO of engine torque for operation in individual control mode is used as another input of the engine torque command generator 34B. The engine torque command generator 34B generates the output of the engine torque calculation generator 130 as an engine torque command TTEPTD in response to presence of mode signal #FPTDON. In response to absence of the mode signal #FPTDON, the engine torque command generator 34B generates the target value TTEAPO of engine torque as the engine torque command. In this implementation, the map as illustrated in FIG. 21 is utilized so that the transition control has been simplified. Other portions or components are substantially the same as their counterparts in the implementation described in connection with FIGS. 1 to 20.

FIG. 26 illustrates still another implementation of the invention. In this implementation, the map as illustrated in a drive force request command generator 41C. A first target value TFDO of drive force for operation in integrated control mode is used as one input into a transition controller 47C. A second target value TFDAPO of drive force for operation in individual control mode is used as the other input into the transition controller 47C. The transition controller 47C generates the first target value TFDO as a drive force command TFDPTDP in response to presence of mode signal #FPTDON. The transition controller 47C generates the second target value TFDAPO as the drive force command TFDPTDP in response to absence of the mode signal #FPTDON. The drive force is used as the input to an engine torque command generator 34A, which generates, as a function of the drive force command, an engine torque command TTEPTD.

The content of disclosure of Japanese Patent Application No. 10-252757 (filed Sep. 7, 1998) is hereby incorporated by reference in its entirety.

The above-described implementation of the present invention is an example implementation. Moreover various modifications to the present invention may occur to those skilled in the art and will fall within the scope of the present invention as set forth below.

What is claimed is:

1. A control system for a vehicle including an engine coupled to apply torque to at least one drive wheel of the vehicle by means of a transmission with a ratio actuator, the ratio actuator being positioned to establish various speed ratios between input and output shafts of the transmission in response to a ratio actuator command, the engine having a throttle which opens in degrees and a throttle actuator positioned to establish various open degrees of the throttle in response to a throttle actuator command, the control system comprising:

sensors sensing an operating parameter indicative of vehicle operator's desire relative to movement of the vehicle and operating parameters indicative of the vehicle status that includes a vehicle speed, an engine speed, and a speed ratio between the input and output shafts of the transmission, a drive force request command generator translating the vehicles operator's desire into a first target value indicative of drive force applicable to the drive wheel for operation in an integrated control mode;

a mode change command generator determining whether or not the integrated control mode should be in operation and generating a mode signal;

a speed command generator generating a speed command in response to said first target value indicative of drive force;

means for generating the ratio actuator command required for the ratio actuator to get said speed command out of the transmission;

a drive force calculation generator estimating a second target value indicative of drive force applicable to the drive wheel for application in an individual control mode;

a transition controller processing said first and second target values and generating a drive force command;

an engine torque command generator generating a torque command in response to said drive force command; and means for generating the throttle actuator command required for the throttle actuator to get said torque command out of the engine.

2. A control system for a vehicle including an engine coupled to apply torque to at least one drive wheel of the vehicle by means of a transmission with a ratio actuator, the ratio actuator being positioned to establish various speed ratios between input and output shafts of the transmission in response to a ratio actuator command, the engine having a throttle which opens in degrees and a throttle actuator positioned to establish various opening degrees of the throttle in response to a throttle actuator command, the control system comprising:

sensor sensing an operating parameter indicative of vehicle operator's desire relative to movement of the vehicle and operating parameters indicative of a vehicle speed, an engine speed, and a speed ratio between the input and output shafts of the transmission;

a drive force request command generator translating said sensed vehicle operator's desire into a first target value indicative of drive force applicable to the drive wheel;

a mode change command generator determining whether or not integrated control mode should be in operation and generating a mode signal;

a speed command generator determining a first target value of speed of the transmission input shaft in response to said first target value indicative of drive force and the sensed vehicle speed, and a second target value of speed of the transmission input shaft in response to the sensed vehicle operator's desire and the sensed vehicle speed, said speed command generator being responsive to said mode signal to generate said first target value of speed of the transmission input shaft as a speed command in response to the presence of said mode signal and to generate said second target value of speed of the transmission input shaft as said speed command in response to the absence of said mode signal;

means for generating the ratio actuator command required for the ratio actuator to get said speed command out of the transmission;

an engine torque request command generator translating the sensed vehicle operator's desire into a target value of torque of the engine;

a drive force calculation generator calculating a second target value indicative drive force applicable to the drive wheel as a function of said target value of torque of the engine and the sensed speed ratio between the input and output shafts of the transmission;

a transition controller processing said first and second target values indicative of drive force to determine a drive force command, an engine torque command generator generating a torque command in response to said drive force command; and means for generating the throttle actuator command required for the throttle actuator to get said torque command out of the engine.

3. The control system as claimed in claim 2, wherein said transition controller calculates said drive force command as a time dependent internal division of a difference between said first and second target values of drive force.

4. The control system as claimed in claim 3, wherein a rate at which said drive force command varies with respect to time decreases as said difference between said first and second target values of drive force increases.

5. The control system as claimed in claim 1, wherein when said drive force command matches said first target value indicative of drive force, said drive force command is replaced by said first target value indicative of drive force.

6. The control system as claimed in claim 1, further comprising an idle switch that is closed when the vehicle operator desires idling of the engine, and wherein, immediately after said idle switch has been closed prior before said drive force command matches any one of said first and second values indicative of drive force, said engine torque command generator sets said target value of torque of the engine as said torque command.

7. A control system for a vehicle including an engine coupled to apply torque to at least one drive wheel of the vehicle by means of a transmission with a ratio actuator, the ratio actuator being positioned to establish various speed ratios between input and output shafts of the transmission in response to a ratio actuator command, the engine having a throttle which opens in degrees and a throttle actuator positioned to establish various opening degrees of the throttle in response to a throttle actuator command, the control system comprising:

sensors sensing an operating parameter indicative of vehicle operator's desire relative to movement of the vehicle and operating parameters indicative of a vehicle speed, an engine speed, and a speed ratio between the input and output shafts of the transmission;

a drive force request command generator translating the vehicle operator's desire into a target value indicative of drive force applicable to the drive wheel;

a mode change command generator determining whether or not integrated control mode should be in operation and generating a mode signal;

a speed command generator determining a first target value of speed of the transmission input shaft in response to said target value indicative of drive force and the sensed vehicle speed, and a second target value of speed of the transmission input shaft in response to the sensed vehicle operator's desire and the sensed vehicle speed, said speed command generator being responsive to said mode signal to generate said first target value of speed of the transmission input shaft as a speed command in response to the presence of said mode signal and to generate said second target value of speed of the transmission input shaft as said speed command in response to the absence of said mode signal;

means for generating the ratio actuator command required for the ratio actuator to get said speed command out of the transmission;

an engine torque calculating generator calculating a first target value of torque of the engine as a function of said target value indicative of drive force;

an engine torque request command generator translating the sensed vehicle operator's desire into a second target value of torque of the engine;

an engine torque command generator generating said first target value of torque of the engine as a torque command in response to presence of said mode signal and said second target value of torque of the engine as said torque command in response to absence of said mode signal; and means for generating the throttle actuator command required for the throttle actuator to get said torque command out of the engine, wherein said drive force request command generator includes a map and performs a table look-up operation of said map against vehicle operator's desire and the sensed vehicle speed to determine said first target value indicative of drive force, said map containing, as said first target value indicative or drive force, data which are indicative of drive force generated by operation of the engine and operation of the transmission during individual control mode within a boundary zone of the integrated control mode that defines a border of the integrated control mode with the individual control mode.

8. A control system for a vehicle including an engine coupled to apply torque to at least one drive wheel of the vehicle by means of a transmission with a ratio actuator, the ratio actuator being positioned to establish various speed ratios between input and output shafts of the transmission in response to a ratio actuator command, the engine having a throttle which opens in degrees and a throttle actuator positioned to establish various opening degrees of the throttle in response to a throttle actuator command, the control system comprising:

sensors sensing an operating parameter indicative of vehicles operator's desire relative to movement of the vehicle and operating parameters indicative of a vehicle speed, an engine speed, and a speed ratio between the input and output shafts of the transmission;

a drive force request command generator translating the vehicle operator's desire into a target value indicative of drive force applicable to the drive wheel;

a mode change command generator determining whether or not integrated control mode should be in operation and generating a mode signal;

a speed command generator determining a first target value of speed of the transmission input shaft in response to said target value indicative of drive force and the sensed vehicle speed, and a second target value of speed of the transmission input shaft in response to the sensed vehicle operator's desire and the sensed vehicle speed, said speed command generator being responsive to said mode signal to generate said first target value of speed of the transmission input shaft as a speed command in response to the presence of said mode signal and to generate said second target value of speed of the transmission input shaft as said speed command in response to the absence of said mode signal;

means for generating the ratio actuation command required for the ratio actuator to get said speed command out of the transmission;

an engine torque request command generator translating the sensed vehicle operator's desire into a target value of torque of the engine;

a drive force calculation generator calculating a second target value indicative of drive force applicable to the drive wheel as a function of said target value of torque of the engine and the sensed speed ratio between the input and output shafts of the transmission;

a transition controller setting said first target value indicative of drive force as an output in response to presence of said mode signal and said second target value indicative of drive force as said output in response to absence of said mode signal, an engine torque command generator generating a torque command in response to said output; and means for generating the throttle actuator command required for the throttle actuator to get said torque command out of the engine, wherein said drive force request command generator includes a map and performs a table look-up operation of said map against vehicle operator's desire and the sensed vehicle speed to determine said first target value indicative of drive force, said map containing, as said first target value indicative of drive force, data indicative of said second target values indicative of drive force during operation within a boundary zone of the integrated control mode that defines a border of the integrated control mode with the individual control mode.

9. A control system for a vehicle including an engine coupled to apply torque to at least one drive wheel of the vehicle by means of the transmission with a ratio actuator, the ratio actuator being positioned to establish various speed ratios between input and output shafts of the transmission in response to a ratio actuator command, the engine having a throttle which opens in degrees and a throttle actuator positioned to establish various open degrees of the throttle in response to a throttle actuator command, the control system comprising:

sensors sensing an operating parameter indicative of vehicle operator's desire relative to movement of the vehicle and operating parameters indicative of the vehicle status that includes a vehicle speed, an engine speed, and a speed ratio between the input and output shafts of the transmission; and a controller translating the vehicle operator's desire into a first target value indicative of drive force applicable to the drive wheel for operation in an integrated control mode, said controller determining whether or not the integrated control mode should be in operation and generating a mode signal, said controller generating a speed command in response to said first target value indicative of drive force;

said controller generating the ratio actuator command required for the ratio actuator to get said speed command out of the transmission, said controller estimating a second target value indicative of drive force applicable to the drive wheel for operation in an individual control mode, said controller estimating a second target value indicative of drive force applicable to the drive wheel for operation in an individual control mode, said controller processing said first and second target values and generating a drive force command, said controller generating a torque command in response to said drive force command; and said controller generating the throttle actuator command required for the throttle actuator to get said torque command out of the engine.

10. A control method for a vehicle including an engine coupled to apply torque to at least one drive wheel of the vehicle by means of a transmission with a ratio actuator, the ratio actuator being positioned to establish various speed ratios between input and output shafts of the transmission in response to a ratio actuator command, the engine having a throttle which opens in degrees and a throttle actuator positioned to establish various open degrees of the throttle in response to a throttle actuator command, the control method comprising:

sensing an operating parameter indicative of vehicle operator's desire relative to movement of the vehicle and operating parameters indicative of the vehicle status that includes a vehicle speed, an engine speed, and a speed ratio between the input and output shafts of the transmission;

translating the vehicle operator's desire into a first target value indicative of drive force applicable to the drive wheel for operation in an integrated control mode, determining whether or not the integrated control mode should be in operation and generating a mode signal, generating a speed command in response to said first target value indicative of drive force;

generating the ratio actuator command required for the ratio actuator to get said speed command out of the transmission, estimating a second target value indicative of drive force applicable to the drive wheel for operating in an individual control mode, processing said first and second target values and generating a drive force command, generating a torque command in response to said drive force command; and generating the throttle actuator command required for the throttle actuator to get said torque command out of the engine.

\* \* \* \* \*